United States Patent
Zohoorian et al.

(10) Patent No.: US 12,484,012 B2
(45) Date of Patent: Nov. 25, 2025

(54) DETERMINING LOCATIONS OF DEPLOYED ACCESS POINTS

(71) Applicant: Juniper Networks, Inc., Sunnyvale, CA (US)

(72) Inventors: Mohammad Zohoorian, San Francisco, CA (US); Christopher Wesley Wright, Scotts Valley, CA (US); Nagarjun Srinivasan, Sunnyvale, CA (US); Jie C Jiang, San Jose, CA (US); Kevin Friday, Los Gatos, CA (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 638 days.

(21) Appl. No.: 17/811,784

(22) Filed: Jul. 11, 2022

(65) Prior Publication Data

US 2023/0080610 A1    Mar. 16, 2023

Related U.S. Application Data

(60) Provisional application No. 63/243,616, filed on Sep. 13, 2021.

(51) Int. Cl.
*H04W 64/00* (2009.01)
*H04L 41/0893* (2022.01)
*H04W 24/02* (2009.01)

(52) U.S. Cl.
CPC ....... *H04W 64/003* (2013.01); *H04L 41/0893* (2013.01); *H04W 24/02* (2013.01)

(58) Field of Classification Search
CPC ... H04W 64/003; H04W 24/02; H04W 88/08; H04W 16/18; H04W 64/00; H04L 41/0893; H04L 41/0823; H04L 43/0864
See application file for complete search history.

(56) References Cited

U.S. PATENT DOCUMENTS 9,363,784 B1    6/2016 Friday et al.
9,729,439 B2    8/2017 MeLampy et al.
(Continued)

FOREIGN PATENT DOCUMENTS

JP    4767101 B2    9/2011
KR    20170115520 A    10/2017

OTHER PUBLICATIONS

Extended Search Report from counterpart European Application No. 22194836.7 dated Feb. 10, 2023, 7 pp.
(Continued)

*Primary Examiner* — Abdullahi Ahmed
(74) *Attorney, Agent, or Firm* — Shumaker & Sieffert, P.A.

(57) ABSTRACT

A network management system (NMS) automatically determines locations of deployed access points (APs) in a wireless network. The system identifies clusters of APs, wherein each AP in a cluster is a member of at least one robust quad, and wherein each robust quad in the cluster has three APs in common with another robust quad in the cluster. The NMS identifies one of the plurality of clusters as a global cluster and the remaining plurality of clusters as local clusters. The NMS determines coordinates of each node in the global cluster based on the coordinates of the anchor APs in the global coordinate system. For each local cluster, the NMS transforms the coordinates of each AP from the respective local coordinate system to the global coordinate system.

20 Claims, 24 Drawing Sheets

(56) References Cited

U.S. PATENT DOCUMENTS

| | | | |
|---|---|---|---|
| 9,729,682 | B2 | 8/2017 | Kumar et al. |
| 9,743,254 | B2 | 8/2017 | Friday et al. |
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,936,352 | B2 | 4/2018 | Sanderovich et al. |
| 9,967,803 | B2 | 5/2018 | Friday et al. |
| 9,985,883 | B2 | 5/2018 | MeLampy et al. |
| 10,200,264 | B2 | 2/2019 | Menon et al. |
| 10,219,166 | B2 | 2/2019 | Friday et al. |
| 10,277,506 | B2 | 4/2019 | Timmons et al. |
| 10,432,522 | B2 | 10/2019 | Kaplan et al. |
| 10,634,776 | B2 | 4/2020 | Anholt et al. |
| 10,756,983 | B2 | 8/2020 | Ratkovic et al. |
| 10,764,858 | B2 | 9/2020 | Srinivasan et al. |
| 10,862,742 | B2 | 12/2020 | Singh |
| 10,958,537 | B2 | 3/2021 | Safavi |
| 10,958,585 | B2 | 3/2021 | Safavi |
| 10,976,406 | B1 | 4/2021 | Castagnoli |
| 10,985,969 | B2 | 4/2021 | Safavi |
| 10,986,607 | B2 | 4/2021 | Ta et al. |
| 10,992,543 | B1 | 4/2021 | Rachamadugu et al. |
| 11,075,824 | B2 | 7/2021 | McCulley et al. |
| 11,226,392 | B1 | 1/2022 | Castagnoli et al. |
| 11,422,224 | B2 | 8/2022 | Castagnoli |
| 11,696,092 | B2 | 7/2023 | Castagnoli et al. |
| 12,004,045 | B2 | 6/2024 | Zohoorian et al. |
| 2015/0045054 | A1 | 2/2015 | Emadzadeh et al. |
| 2015/0139213 | A1 | 5/2015 | Abraham et al. |
| 2017/0272911 | A1 | 9/2017 | Agrawal et al. |
| 2020/0187074 | A1* | 6/2020 | Wong ............... H04W 36/0055 |
| 2020/0209340 | A1 | 7/2020 | Ylamurto et al. |
| 2020/0322776 | A1* | 10/2020 | Pazhyannur .......... H04W 12/06 |
| 2020/0403890 | A1 | 12/2020 | McCulley et al. |
| 2021/0231435 | A1 | 7/2021 | Nobayashi |
| 2021/0239850 | A1 | 8/2021 | Castagnoli et al. |
| 2021/0243558 | A1 | 8/2021 | Castagnoli et al. |
| 2021/0243559 | A1 | 8/2021 | Castagnoli et al. |
| 2021/0243717 | A1 | 8/2021 | Castagnoli et al. |
| 2021/0306201 | A1 | 9/2021 | Wang et al. |
| 2022/0191647 | A1* | 6/2022 | Zohoorian ............ H04W 4/029 |
| 2023/0047635 | A1* | 2/2023 | Friday ..................... H04L 41/22 |
| 2023/0069236 | A1 | 3/2023 | Kozin et al. |
| 2023/0143729 | A1* | 5/2023 | Zohoorian ...... H04W 36/00837 |
| | | | 455/432.1 |
| 2023/0388819 | A1 | 11/2023 | Lin et al. |
| 2024/0179168 | A1* | 5/2024 | Manthiramoorthy ........................ |
| | | | H04L 63/0876 |
| 2024/0267816 | A1* | 8/2024 | Chorppath ............ H04W 28/26 |

OTHER PUBLICATIONS

Capkun et al., "GPS-free positioning in mobile Ad-Hoc networks", Proceedings of the 34th Hawaii International Conference on System Sciences, vol. 9, Jan. 3, 2001, pp. 157-167.

Eren et al., "Rigidity, computation, and randomization in network localization", IEEE INFOCOM 2004, vol. 4, Mar. 7, 2004, pp. 2673-2684.

Estrin et al., "Embedding the internet: introduction", Communications of the ACM, vol. 43, No. 5, May 1, 2000, pp. 38-41.

Horn, "Closed-form solution of absolute orientation using unit quaternions", Journal of the Optical Society of America A—optics Image Science and Vision, vol. 4, No. 4, Apr. 1, 1987, pp. 629-642.

Moore et al., "Robust distributed network localization with noisy range measurements", Proceedings of the 2nd international conference on Embedded networked sensor systems, Nov. 3, 2004, pp. 50-61.

Niculescu et al., "DV Based Positioning in Ad Hoc Networks", Telecommunication Systems, vol. 22, No. 1, Aug. 27, 2002, pp. 267-280.

Savvides et al., "On the Error Characteristics of Multihop Node Localization in Ad-Hoc Sensor Networks", Information Processing in Sensor Networks, Apr. 22, 2003, pp. 317-332.

U.S. Appl. No. 17/303,222, filed May 24, 2021, naming inventors Safavi.

U.S. Appl. No. 63/363,353, filed Apr. 21, 2022, naming inventors Zohoorian et al.

U.S. Appl. No. 63/367,354, filed Jun. 29, 2022, naming inventors Wright et al.

Wikipedia, "Rotations and reflections in two dimensions", 2 pp., Retrieved from the Internet on Jul. 20, 2022, from URL: https://en.wikipedia.org/wiki/Rotations_and_reflections_in_two_dimensions.

Zekavat et al., "Handbook of Position Location: Theory, Practice, and Advances", Chapters 11, 12, and 13, John Wiley & Sons, Inc, Sep. 9, 2011, pp. 359-455.

Response to Extended Search Report dated Feb. 10, 2023, from counterpart European Application No. 22194836.7 filed Sep. 11, 2023, 20 pp.

Cai et al., "Identification and Mitigation of NLOS Based on Channel State Information for Indoor WiFi Localization", International Conference on Wireless Communications & Signal Processing (WCSP), IEEE, Oct. 15, 2015, 5 pp.

Choi et al., "Deep Learning Based NLOS Identification With Commodity WLAN Devices", IEEE Transactions on Vehicular Technology, vol. 67, No. 4, IEEE, Apr. 2018, pp. 3295-3303.

Communication pursuant to Article 94(3) EPC from counterpart European Application No. 22194836.7 dated Mar. 21, 2025, 6 pp.

Han et al., "Indoor NLOS Positioning System Based on Enhanced CSI Feature with Intrusion Adaptability", Sensors, MDPI, Feb. 22, 2020, 25 pp.

Jiokeng et al., "When FTM Discovered Music: Accurate WiFi-based Ranging in the Presence of Multipath", IEEE, Nov. 13, 2020, 11 pp.

Wu et al., "PhaseU: Real-time LOS Identification with WiFi", IEEE Conference on Computer Communications (INFOCOM), IEEE, Apr. 26, 2015, pp. 2038-2046.

Xiao et al., "AmpN: Real-time LOS/NLOS Identification with WiFi", IEEE ICC 2017 Ad-Hoc and Sensor Networking Symposium, IEEE, May 21, 2017, 7 pp.

Zhou et al., "WiFi-based Indoor Line-Of-Sight Identification", IEEE Transactions on Wireless Communications, IEEE, Jun. 22, 2015, 11 pp.

Response to Communication pursuant to Article 94(3) EPC dated Mar. 21, 2025, from counterpart European Application No. 22194836.7 filed Jul. 17, 2025, 4 pp.

\* cited by examiner

DETERMINING LOCATIONS OF DEPLOYED ACCESS POINTS

This application claims the benefit of U.S. Provisional Patent Application No. 63/243,616, filed 13 Sep. 2021, which is incorporated by reference herein in its entirety.

FIELD

The disclosure relates generally to computer networks and, more specifically, to determining locations of deployed access points.

BACKGROUND

Commercial premises, such as offices, hospitals, airports, stadiums, or retail outlets, often include a network of wireless access points (APs) installed throughout the premises to provide wireless network services to one or more wireless client devices. APs enable client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. Location services that may be provided in conjunction with a wireless network include wayfinding, location-based proximity notifications, asset tracking, and location-based analytics that derive insights from client mobility through the premises.

SUMMARY

In general, this disclosure describes techniques for determining locations of deployed access points (APs). The APs may be deployed throughout premises to establish a wireless network at a customer site. In accordance with one or more techniques of the disclosure, a computing device, such as a computing device of a network management system (NMS) configured to monitor and manage a plurality of APs in the wireless network, may automatically and with a high degree of accuracy determine the location of the APs deployed at a site. The techniques described herein may also apply to determining locations of any type of computing devices in a wired or wireless network.

The techniques disclosed herein utilize the concept of "robust quadrilaterals", "robust squares", or "robust quads" in graph theory to minimize errors in determining locations of nodes in a network graph with respect to the location(s) of other nodes in the network graph. The nodes may include, for example, APs or other computing devices in a wireless or wired network at a site. For example, based on a network graph representing neighbor relationships between a plurality of nodes, and based on distances between neighboring nodes, a computing device identifies robust quad relationships between the nodes. Each robust quad comprises four nodes wherein each node is a neighbor of every other node in the robust quad. Two nodes are considered to be "neighbors" if they are able to communicate with each other, so that the distance between each pair of nodes is known (e.g., based on round trip time (RTT) measurements). The computing device further identifies clusters of nodes wherein each node in a cluster is a member of at least one robust quad, and wherein each robust quad in the cluster has at least three nodes in common with another robust quad in the cluster. In other words, a cluster can be considered to be a set of connected robust quads.

The computing device defines one of the plurality of clusters as a global cluster for the site. In some examples, the global cluster is defined as the cluster having the largest number of robust quads. At least 3 nodes (e.g., APs) in the global cluster are selected as anchor nodes. In some examples, 4 nodes are selected as anchor nodes. In some examples, one or more factors may be considered to determine which nodes are to be selected as the anchor nodes.

The coordinate locations of the anchor nodes in the global cluster are measured with respect to a global coordinate system for the site. The coordinates of the anchor nodes in the global coordinate system may thus be considered to be known (as opposed to derived). In some examples, the MAC address of the anchor nodes is communicated to a network administrator for the site, and the coordinates of the anchor nodes in the global coordinate system are manually determined, such as by using GPS, laser measurement techniques, or by other direct observation or measurement techniques. The coordinates of the remaining nodes in the global cluster in the global coordinate system are determined by trilateration based on the known coordinates of the anchor nodes in the global coordinate system.

For all clusters other than the global cluster ("local clusters"), the computing device identifies an origin robust quad (i.e., an anchor quad) for the local cluster. One or more factors may be considered when selecting the origin robust quad for the local cluster as described herein. The computing device defines a local coordinate system based on three nodes that are members of the origin robust quad. The coordinates of the fourth node of the origin robust quad in the local coordinate system is determined by trilateration based on the coordinates of the other three nodes in the origin node. The coordinates of the remaining nodes in the local cluster in the local coordinate system are determined by trilateration based on the coordinates of the four nodes in the origin robust quad.

The computing device next transforms the coordinates of each node of a local cluster in the respective local coordinate system to the global coordinate system. To transform the coordinates of nodes in a local coordinate system to the global coordinate system, the computing device determines a coordinate transformation (e.g., a translation, rotation, and/or reflection) between the local coordinate system and the global coordinate system. In this way, the locations of all the nodes in the local clusters can be determined in the global coordinate system with a high degree of accuracy based on the known (e.g., measured) locations of the anchor nodes in the global coordinate system.

To perform the coordinate transformations, the computing device determines a "distance" between each local cluster and the global cluster. Based on the distances between the global cluster and each local cluster, the coordinates of the nodes in the local cluster that is "nearest" to the global cluster are transformed to the global coordinate system. The global cluster and the nearest local cluster are then merged to form a merged global cluster. The computing device iteratively determines a "distance" between each remaining local cluster and the merged global cluster, transforms the coordinates of the nearest local cluster to the global coordinate system, and merges the nearest global cluster with the global cluster until all of the clusters at the site have been merged into the global cluster. In this way, the global cluster expands at each iteration until it covers the whole site.

The resulting coordinates of each node at the site in the global coordinate may be stored in database for further monitoring and/or analysis. In addition, the computing device may automatically generate one or more suggestions and/or automatically invoke one or more actions based on the coordinates for one or more of the plurality of nodes. In another example, the determined AP coordinate locations are used to determine the location of client devices associated with, e.g., communicating via, the APs.

The techniques of the disclosure may provide one or more technical advantages and practical applications. As an example, the techniques described herein enable automated determination of the location of a plurality of deployed APs to provide highly accurate determination of AP locations quickly and efficiently. Determining the locations based on robust quad relationships between the nodes ensures the accuracy of the location determinations and reduces the likelihood of flip ambiguities and/or discontinuous flex ambiguities. The ability to automatically determine the location of APs may greatly reduce the cost to deploy a wireless network because it is not necessary to dispatch technicians to conduct a survey of the entire site. It may also increase the accuracy of the determined AP locations as compared to the error-prone and time consuming process of manually measuring and logging of hundreds or even thousands of AP locations. In addition, the technique may be used to detect when an AP is moved or when a new AP is installed, e.g., as a replacement for a faulty AP, in a slightly different location. Yet another benefit is that it facilitates automated and remote verification of AP deployment locations without necessitating dispatching technicians to conduct an on-site survey. The techniques therefore support the provision of highly accurate location-based services at a site, which depend upon the locations of each of AP being known to a high degree of accuracy. In addition, the determined AP locations provided by the techniques described herein may further be used for RF coverage optimization and radio resource management of the APs at the site, such as channel and transmit power level selection.

In one example, the disclosure is directed to a system comprising: a plurality of access point devices (APs) configured to provide a wireless network at a site; and a network management system comprising: one or more processors; and a memory comprising instructions that when executed by the one or more processors cause the one or more processors to: based on neighbor relationships between the plurality of APs, identify a plurality of clusters of APs, wherein each AP in a cluster is a member of at least one robust quad, and wherein each robust quad in the cluster has three APs in common with another robust quad in the cluster; determine coordinates of each AP in a global cluster of the plurality of clusters in a global coordinate system based on measured coordinates of at least three anchor APs in the global cluster; for each of the plurality of clusters other than the global cluster, determine coordinates of each AP in the cluster in a local coordinate system associated with the cluster; for each of the plurality of clusters other than the global cluster, transform the coordinates of the locations of each AP in the cluster from the associated local coordinate system to the global coordinate system; and automatically invoke, based on the coordinate locations of one or more of the plurality of APs in the global coordinate system, one or more actions.

In another example, the disclosure is directed to a method comprising: based on neighbor relationships between the plurality of APs, identifying a plurality of clusters of APs, wherein each AP in a cluster is a member of at least one robust quad, and wherein each robust quad in the cluster has three APs in common with another robust quad in the cluster; determining coordinates of each AP in a global cluster of the plurality of clusters in a global coordinate system based on measured coordinates of at least three anchor APs in the global cluster; for each of the plurality of clusters other than the global cluster, determining coordinates of each AP in the cluster in a local coordinate system associated with the cluster; for each of the plurality of clusters other than the global cluster, transforming the coordinate locations of each AP in the cluster from the associated local coordinate system to the global coordinate system; and automatically invoking, based on the coordinate locations of one or more of the plurality of APs in the global coordinate system, one or more actions.

In another example, the disclosure is directed to a non-transitory computer-readable medium comprising instructions that when executed by the one or more processors cause the one or more processors to: based on neighbor relationships between the plurality of APs, identify a plurality of clusters of APs, wherein each AP in a cluster is a member of at least one robust quad, and wherein each robust quad in the cluster has three APs in common with another robust quad in the cluster; determine coordinates of each AP in a global cluster of the plurality of clusters in a global coordinate system based on measured coordinates of at least three anchor APs in the global cluster; for each of the plurality of clusters other than the global cluster, determine coordinates of each AP in the cluster in a local coordinate system associated with the cluster; for each of the plurality of clusters other than the global cluster, transform the coordinate locations of each AP in the cluster from the associated local coordinate system to the global coordinate system; and generating data representative of a user interface (UI) for display on a display device including user interface elements representing one or more of the plurality of APs at the site and the corresponding locations of one or more of the plurality of APs at the site.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
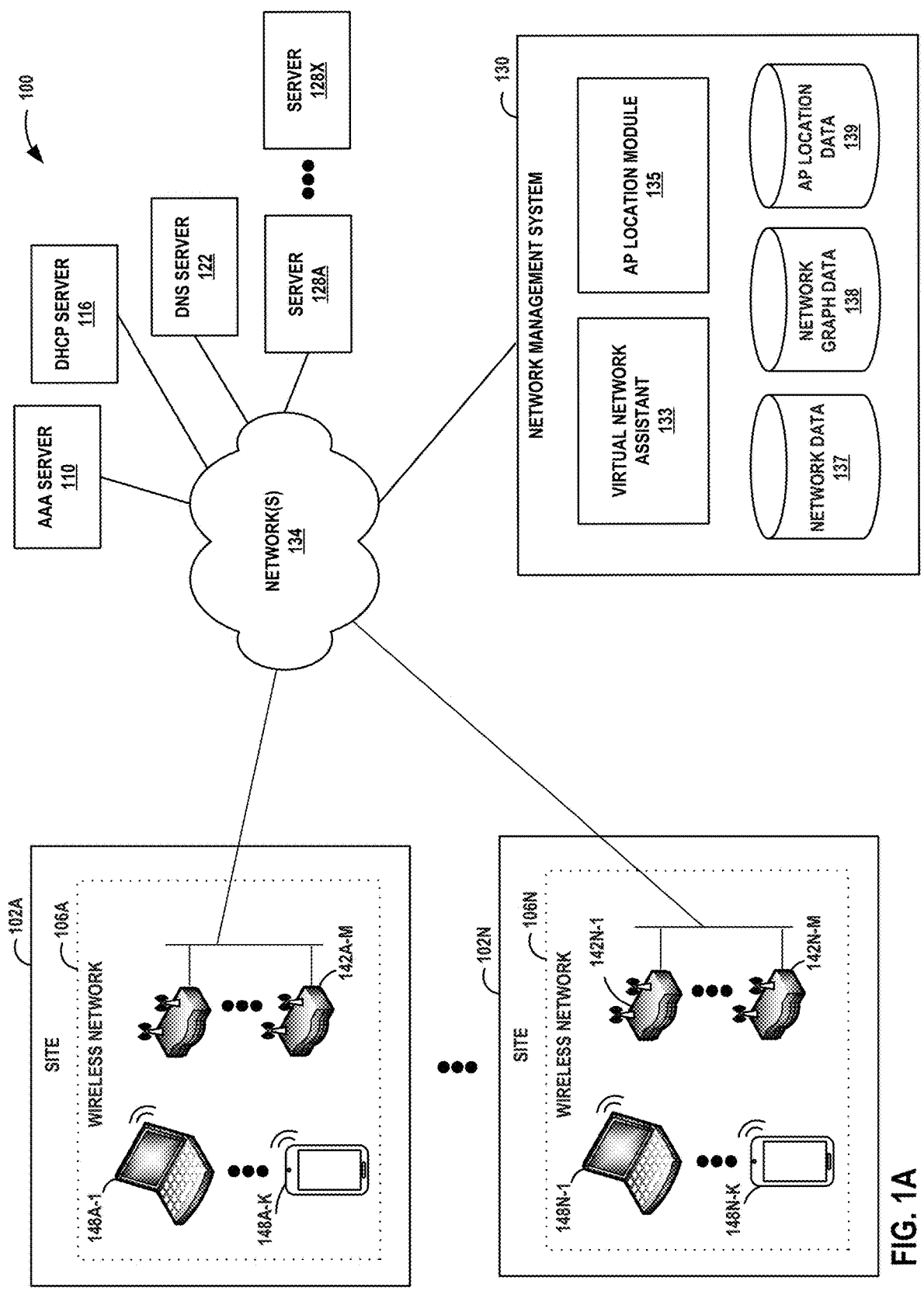
FIG. 1A is a diagram of an example network system 100 that determines locations of deployed access points (APs), in accordance with one or more techniques of the disclosure.

FIG. 1A is a diagram of an example network system 100 that determines locations of deployed access points (APs), in accordance with one or more techniques of the disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect. In addition, although the examples will be described herein with respect to determining locations of APs in a wireless network, the techniques described herein may also be applied to determining locations of any type of computing devices in a wired or wireless network.

Sites 102, such as enterprises, offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-N. Similarly, site 102N includes a plurality of AP devices 142N-1 through 142N-N. Each AP device 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may include a plurality of states or parameters indicative of one or more aspects of wireless network performance. The data may be ingested form numerous sources, including client devices, APs, switches, firewalls etc. The network data may be stored in a database, such as network data 137 within NMS 130 or, alternatively, in an external database. In general, NMS 130 may provide a cloud-based platform for network data acquisition, monitoring, activity logging, reporting, predictive analytics, network anomaly identification, and alert generation. In some examples, NMS 130 uses a combination of artificial intelligence, machine learning, and data science techniques to optimize user experiences and simplify operations across any one or more of wireless access, wired access, and SD-WAN domains.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100, such as switches or firewalls. In accordance with one specific implementation, network management server 130 includes at least one computing device or processor. In accordance with other implementations, NMS 130 may comprise one or more computing devices, processors, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. For example, VNA 133 of NMS 130 may include a network performance engine that automatically determines one or more service level experience (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client's device received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor wireless network performance metrics detected or predicted from the streams of event data. VNA 133 may generate a notification indicative of the root cause and/or one or more remedial actions that may be taken to address the root cause of the error conditions or poor wireless network performance metrics. In some examples, if the root cause may be automatically resolved, VNA 133 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with the techniques described in this disclosure, NMS 130 includes an AP location module 135 configured to determine locations of deployed APs in a wireless network. AP location module 135, when executed by one or more processor(s) of NMS 130, utilizes the concept of "robust quadrilaterals", "robust squares", or "robust quads" in graph theory to minimize errors in determining locations of nodes in a network graph with respect to the location(s) of other nodes in the network graph. The nodes may include, for example, APs or other computing devices in a wireless or wired network at a site. For example, based on a network graph representing neighbor relationships between a plurality of nodes, and based on distances between neighboring nodes, AP location module identifies robust quad relationships between the nodes. The network graph(s) may be stored in, for example, network graph data 138. Each robust quad comprises four nodes wherein each node is a neighbor of every other node in the robust quad. Two nodes are considered to be "neighbors" if they are able to communicate with each other, so that the distance between each pair of nodes is known (e.g., based on round trip time (RTT) measurements). AP location module 135 further identifies clusters of nodes wherein each node in a cluster is a member of at least one robust quad, and wherein each robust quad in the cluster has at least three nodes in common with another robust quad in the cluster. In other words, a cluster can be considered to be a set of connected robust quads. A robust quad is connected to another if both quads share three overlapping nodes (3 nodes in common).

AP location module 135 defines one of the plurality of clusters as a global cluster for the site. In some examples, the global cluster is defined as the cluster having the largest number of robust quads. At least 3 nodes (e.g., APs) in the global cluster are selected as anchor nodes. In some examples, 4 nodes are selected as anchor nodes. One or more factors may be considered when selecting the anchor nodes. In some examples, the anchor nodes belong to a robust quad which overlaps (e.g., has 3 nodes in common) with the largest number of other robust quads in the cluster. In some examples, the anchor nodes belong to a robust quad having the most "square-like" shape; that is, a robust quad in which the distances between the opposing corners of the robust quad are substantially equivalent or closest to being equivalent. In some examples, the anchor nodes belong to a robust quad having a relatively larger perimeter, or having at least one side that is relatively larger than the largest side of the other robust quads; that is, the anchor nodes belong to a robust quad having a relatively larger overall "size" as compared to other of the robust quads. In another example, nodes in the center of the cluster are selected to be the anchor nodes, based on measurements such as the betweenness centrality, weighted betweenness centrality, Percolation centrality, etc. In some examples, a score is assigned to each robust quad based on one or more of these factors, and a robust quad is selected based at least in part on the score.

The coordinate locations of the anchor nodes in the global cluster are measured with respect to a global coordinate system for the site. The coordinates of the anchor nodes in the global coordinate system may thus be considered to be known (as opposed to derived). In some examples, the MAC address of the anchor nodes is communicated to a network administrator for the site, and the coordinates of the anchor nodes in the global coordinate system are manually determined, such as by using GPS, laser measurement techniques, or by other direct observation or measurement techniques. The coordinates of the remaining nodes in the global cluster in the global coordinate system are determined by trilateration based on the known coordinates of the anchor nodes in the global coordinate system.

For all clusters other than the global cluster ("local clusters"), AP location module 135 identifies an origin robust quad (i.e., an anchor quad) for the local cluster. One or more factors may be considered when selecting the origin robust quad for the cluster as described herein below. AP location module 135 defines a local coordinate system based on three nodes that are members of the origin robust quad. The coordinates of the fourth node of the origin robust quad in the local coordinate system is determined by trilateration based on the coordinates of the other three nodes in the origin node. The coordinates of the remaining nodes in the local cluster in the local coordinate system are determined by trilateration based on the coordinates of the four nodes in the origin robust quad.

AP location module 135 transforms the coordinates of each node of a local cluster in the respective local coordinate system to the global coordinate system. To transform the coordinates of nodes in a local coordinate system to the global coordinate system, AP location module 135 determines a coordinate transformation (e.g., a translation, rotation, and/or reflection) between the local coordinate system and the global coordinate system. In this way, the locations of all of the nodes in the local clusters can be determined in the global coordinate system with a high degree of accuracy based on the known (e.g., measured) locations of the anchor nodes in the global coordinate system.

To perform the coordinate transformations, AP location module 135 determines a "distance" between each local cluster and the global cluster. Based on the distances between the global cluster and each local cluster, the coordinates of the nodes in the local cluster that is "nearest" to the global cluster are transformed to the global coordinate system. The global cluster and the nearest local cluster are then merged to form a merged global cluster. AP location module 135 iteratively determines a "distance" between each remaining local cluster and the merged global cluster, transforms the coordinates of the nearest local cluster to the global coordinate system, and merges the nearest global cluster with the global cluster until all of the clusters at the site have been merged into the global cluster. In this way, the global cluster expands at each iteration until it covers the whole site.

AP location module 135 may store the resulting coordinates of each node at the site in the global coordinate in a database for further monitoring and/or analysis. In addition, NMS 130 may automatically generate one or more suggestions and/or automatically invoke one or more actions based on the coordinates for one or more of the plurality of nodes. In another example, the determined AP coordinate locations are used to determine the location of client devices associated with, e.g., communicating via, the APs.

Figure 1B:
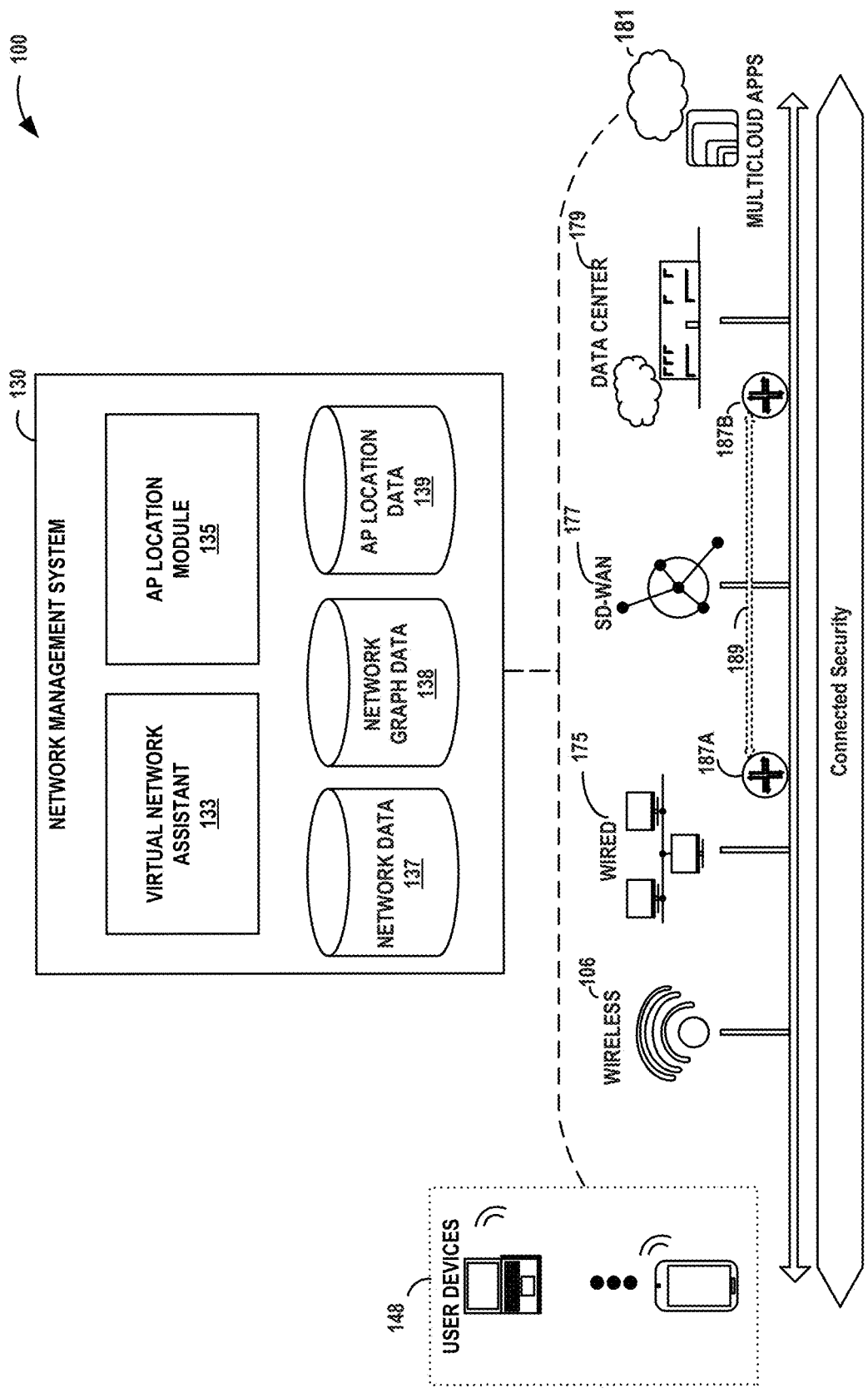
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B). NMS 130 includes a virtual network assistant 133, AP location module 135, network data 137, network graph data 138 and AP location data 139.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
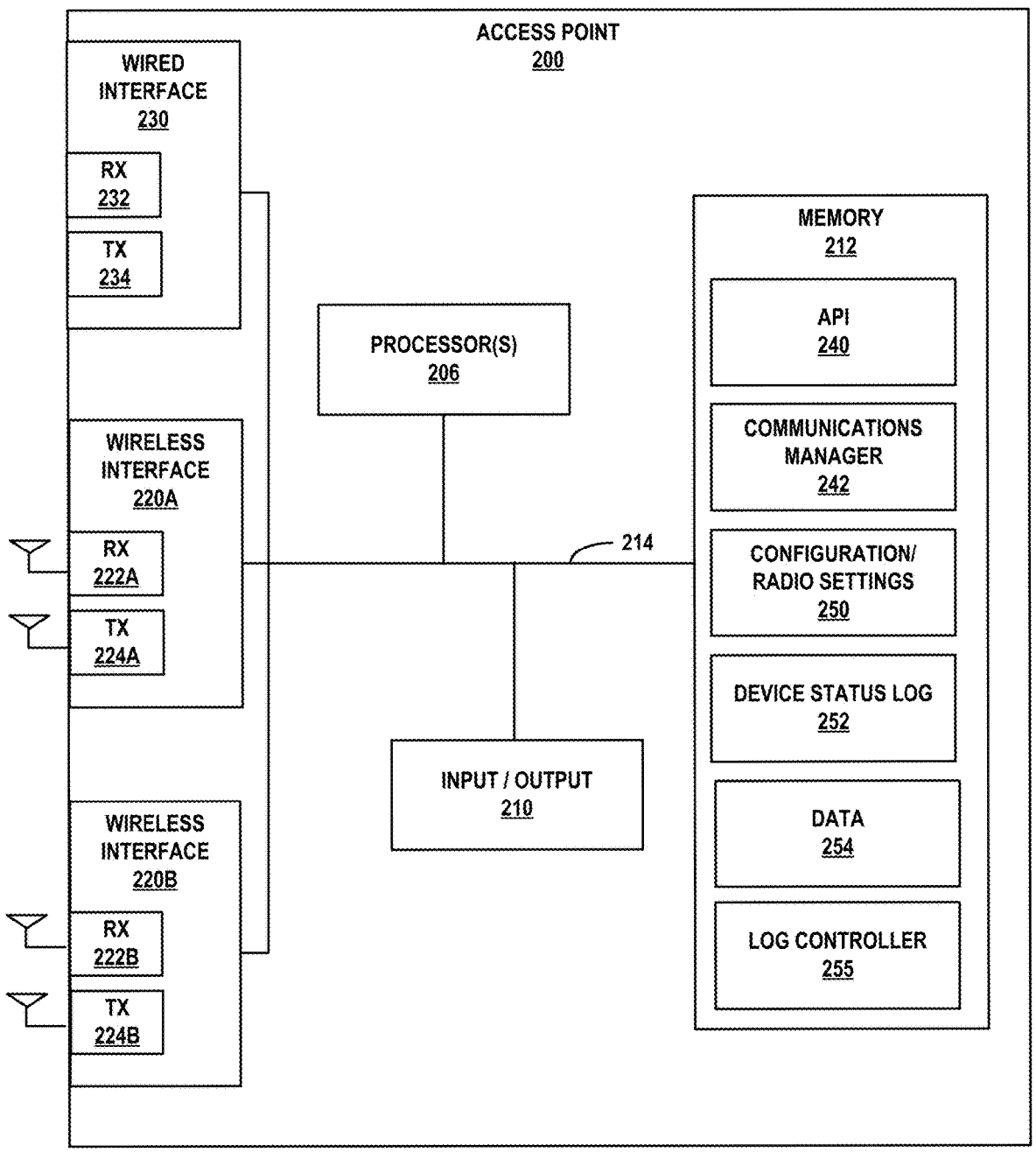
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data storage 254 may include, for example, AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, one or more types of proximity events, etc., as well as a time and date stamp for each event. In some examples, the network data stored in data storage 254 is data indicative of the distances between the AP 200 and its neighbors such as received signal strength indicators (RSSIs) of wireless signals received from the neighboring APs, the round trip time (RTT) of a signal traveling from the AP to its neighbor and being echoed by the neighbor, etc. Log controller 255 determines a logging level for the device based on instructions from NMS 130. Data 254 may store any data used and/or generated by access point device 200, including data collected from UEs 148.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

In some examples, rather than the NMS 130 determining the locations of deployed APs, one or more of the APs 142 themselves may be configured to determine the locations of one or more of the deployed APs 142 and/or automatically execute other functionality based on the determined locations.

Figure 3:
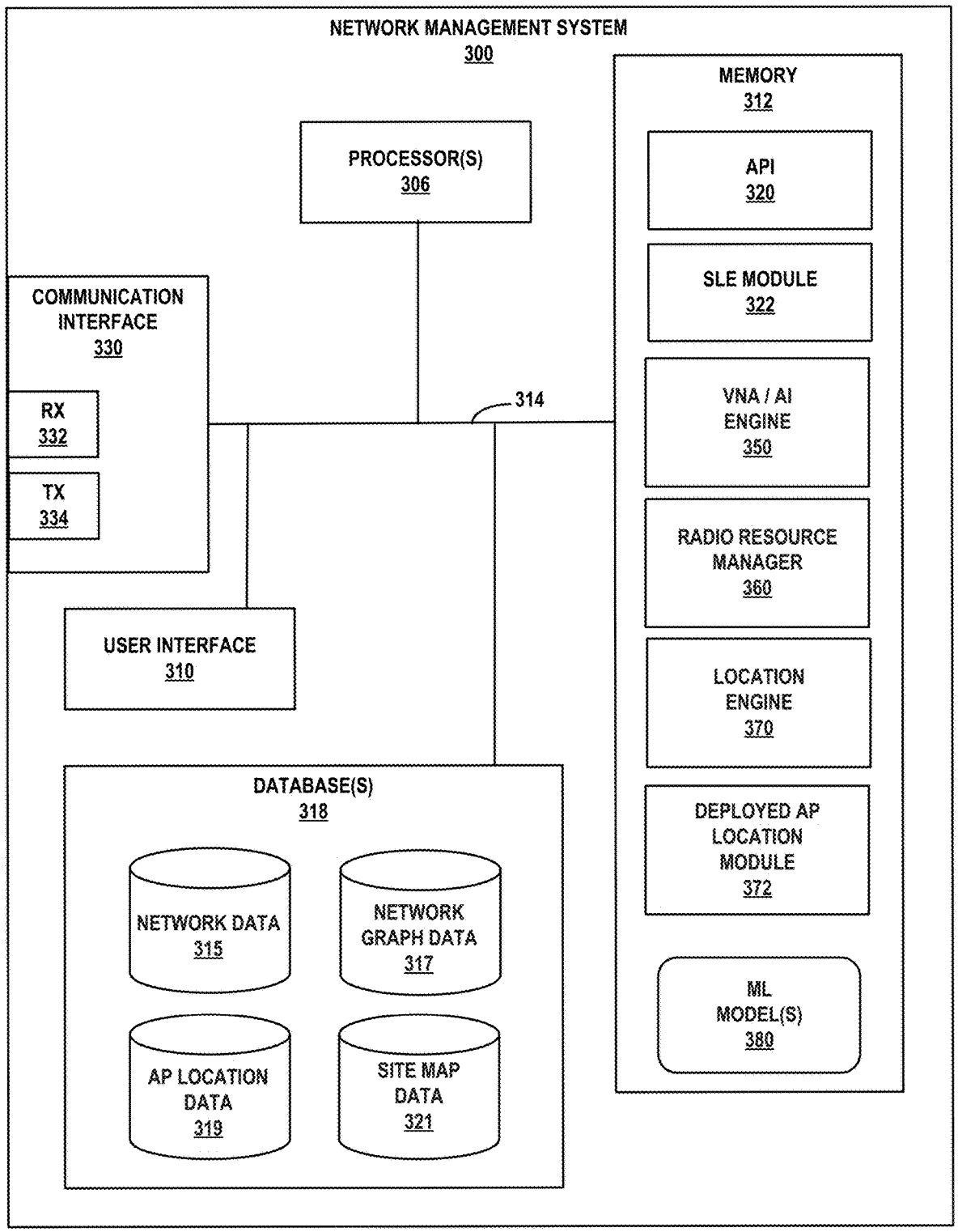
FIG. 3 is a block diagram of an example network management system configured to determine locations of deployed APs, in accordance with one or more techniques of the disclosure.

FIG. 3 is a block diagram of an example network management system (NMS) 300 configured to determine locations of deployed APs, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively including determining the locations of APs 142. In some examples, NMS 300 receives network data collected by AP devices 142 from UEs 148, such as network data including proximity information used to determine one or more proximity assessments, and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIGS. 1A-1B. The data and information received by NMS 300 may include, for example, network data and/or event log data received from access points 142 used by NMS 300 to remotely monitor and/or control the performance of wireless networks 106A-106N and to determine the locations of APs 142. NMS may further transmit data via communications interface 330 to any of network devices such as APs 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, a location engine 370, an AP location module 372, and one or more machine learning models 380. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 106A-106N in order to learn and optimize the power and/or radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may measure the strength of a radio signal of client devices, such as an RSSI value. RRM engine 360 may further automatically change or update configurations of one or more AP devices 142 at a site 106 with an aim to improve the coverage and/or capacity SLE metrics and thus to provide an improved wireless experience for the user. In some examples, RRM engine 360 may use AP location information determined by AP location module 372 in order to learn and optimize the RF environment provided by the wireless network.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. VNA/AI engine 350 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 350 may automatically invoke one or more remedial actions intended to address the identified root cause(s) of one or more poor SLE metrics. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

SLE module 322 enables set up and tracking of thresholds for one or more SLE metrics for each of wireless networks 106A-106N. SLE module 322 further analyzes network data (e.g., stored as network data 316) collected by AP devices and/or UEs associated with wireless networks 106A-106N, such as any of AP devices 142 from UEs 148 in each wireless network 106A-106N. For example, AP devices 142A-1 through 142A-N collect network data from UEs 148A-1 through 148A-N currently associated with wireless network 106A (e.g., named assets, connected/unconnected Wi-Fi clients). This data, in addition to any network data collected by one or more APs 142A-1 through 142A-N in wireless network 106A, is transmitted to NMS 300 and stored as, for example, network data 315.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

In accordance with the techniques described in this disclosure, NMS 300 includes an AP location module 372. AP location module 372, when executed by one or more processor(s) of NMS 300, utilizes the concept of "robust quadrilaterals", "robust squares", or "robust quads" in graph theory to minimize errors in determining locations of nodes in a network graph with respect to the location(s) of other nodes in the network graph. The nodes may include, for example, APs or other computing devices in a wireless or wired network at a site. For example, based on a network graph (e.g., stored as network graph data 317) representing neighbor relationships between a plurality of nodes, and based on distances between neighboring nodes, AP location module identifies robust quad relationships between the nodes. Each robust quad comprises four nodes wherein each node is a neighbor of every other node in the robust quad. Two nodes are considered to be "neighbors" if they are able to communicate with each other, so that the distance between each pair of nodes is known (e.g., based on round trip time (RTT) measurements). AP location module 372 further identifies clusters of nodes wherein each node in a cluster is a member of at least one robust quad, and wherein each robust quad in the cluster has at least three nodes in common with another robust quad in the cluster. In other words, a cluster can be considered to be a set of connected robust quads.

Network graph 317 is constructed based on information indicative of the distances between the APs. This information may be measured information, or alternatively may be determined by measurements of RSSI, RTT, etc., and using this information to calculate the distances between the APs. In some examples, neighboring APs are determined based on a first AP being able to receive a signal from a second AP at an RSSI greater than a predetermined threshold. Example Wi-Fi RTT techniques are described in the IEEE 802.11mc (i.e., IEEE 802.11-2016) standard, which defines a fine-time measurement (FTM) protocol that can be used to measure the Wi-Fi signal round trip time (RTT). In some examples, RTT measurements between APs are obtained using techniques described in U.S. Provisional Patent Application 63/367,354, filed on Jun. 30, 2022, and entitled "Orchestration of Round-Trip Time (RTT) Measurements," which is incorporated by reference herein in its entirety.

AP location module 372 defines one of the plurality of clusters as a global cluster for the site. In some examples, the global cluster is defined as the cluster having the largest number of robust quads. At least 3 nodes (e.g., APs) in the global cluster are selected as anchor nodes. In some examples, 4 nodes are selected as anchor nodes. One or more factors may be considered when selecting the anchor nodes. In some examples, the anchor nodes belong to a robust quad which overlaps (e.g., has 3 nodes in common) with the largest number of other robust quads in the cluster. In some examples, the anchor nodes belong to a robust quad having the most "square-like" shape; that is, a robust quad in which the distances of each of the four "sides" of the robust quad are substantially equivalent or closest to being equivalent. In some examples, the anchor nodes belong to a robust quad having a relatively larger perimeter (e.g., the sum of the distances of the four "sides" of the robust quad); that is, the anchor nodes belong to a robust quad having a relatively larger overall "size" as compared to other of the robust quads. In another example, nodes in the center of the cluster are selected to be the anchor nodes, based on measurements such as the betweenness centrality, weighted betweenness centrality, Percolation centrality, etc. In some examples, a score is assigned to each robust quad based on one or more of these factors, and a robust quad is selected based at least in part on the score.

The coordinate locations of the anchor nodes in the global cluster are measured with respect to a global coordinate system for the site. The coordinates of the anchor nodes in the global coordinate system may thus be considered to be known (as opposed to derived). In some examples, the MAC address of the anchor nodes is communicated to a network administrator for the site, and the coordinates of the anchor nodes in the global coordinate system are manually determined, such as by using GPS, laser measurement techniques, or by other direct observation or measurement techniques. The coordinates of the remaining nodes in the global cluster in the global coordinate system are determined by trilateration based on the known coordinates of the anchor nodes in the global coordinate system.

For all clusters other than the global cluster ("local clusters"), AP location module 372 identifies an origin robust quad (i.e., an anchor quad) for the local cluster. One or more factors may be considered when selecting the origin robust quad for the cluster as described herein. The computing device defines a local coordinate system based on three nodes that are members of the origin robust quad. The coordinates of the fourth node of the origin robust quad in the local coordinate system is determined by trilateration based on the coordinates of the other three nodes in the origin node. The coordinates of the remaining nodes in the local cluster in the local coordinate system are determined by trilateration based on the coordinates of the four nodes in the origin robust quad.

AP location module 372 transforms the coordinates of each node of a local cluster in the respective local coordinate system to the global coordinate system. To transform the coordinates of nodes in a local coordinate system to the global coordinate system, AP location module 372 determines a coordinate transformation (e.g., a translation, rotation, and/or reflection) between the local coordinate system and the global coordinate system. In this way, the locations of all of the nodes in the local clusters can be determined in the global coordinate system with a high degree of accuracy based on the known (e.g., measured) locations of the anchor nodes in the global coordinate system.

To perform the coordinate transformations, AP location module 372 determines a "distance" between each local cluster and the global cluster. Based on the distances between the global cluster and each local cluster, the coordinates of the nodes in the local cluster that is "nearest" to the global cluster are transformed to the global coordinate system. The global cluster and the nearest local cluster are then merged to form a merged global cluster. AP location module 372 iteratively determines a "distance" between each remaining local cluster and the merged global cluster, transforms the coordinates of the nearest local cluster to the global coordinate system, and merges the nearest global cluster with the global cluster until all of the clusters at the site have been merged into the global cluster. In this way, the global cluster expands at each iteration until it covers the whole site.

AP location module 372 may store the resulting coordinates of each node at the site in the global coordinate in a database for further monitoring and/or analysis. In addition, NMS 130 may automatically generate one or more suggestions and/or automatically invoke one or more actions based on the coordinates for one or more of the plurality of nodes. In another example, the determined AP coordinate locations are used to determine the location of client devices associated with, e.g., communicating via, the APs.

Figure 4:
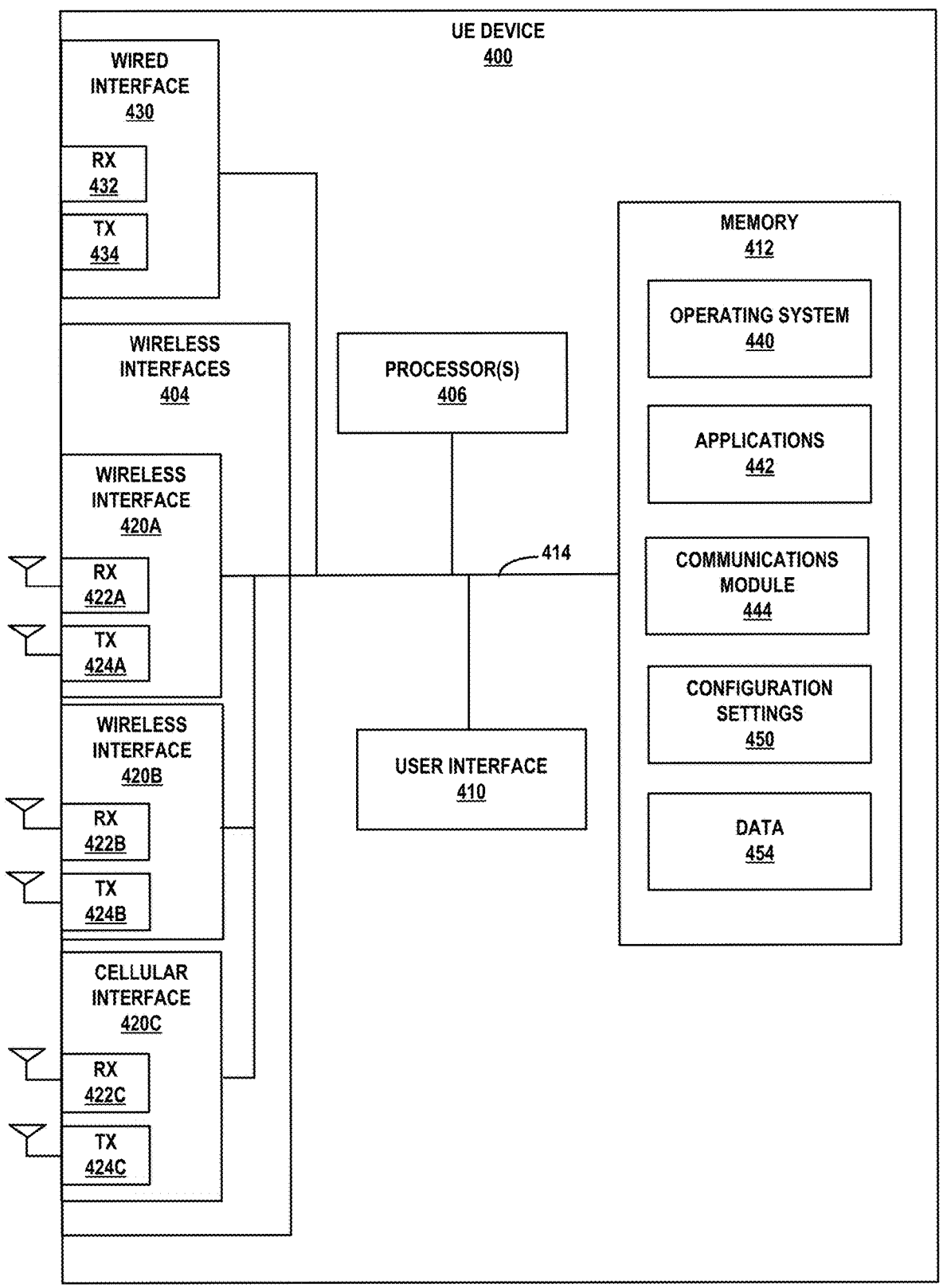
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, NMS 130 receives relevant network data from UEs 148 on a continuous basis (e.g., every 2 seconds or other appropriate time period). The network data 454 may include, for example, RSSI measurements of one or more wireless signals received from one or more AP devices by UE 400 as measured by the AP devices.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by UE 400, such as network data used to determine proximity to a proximity zone, that is collected by UE 400 and transmitted to any of AP devices 142 in a wireless network 106 for further transmission to NMS 150.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
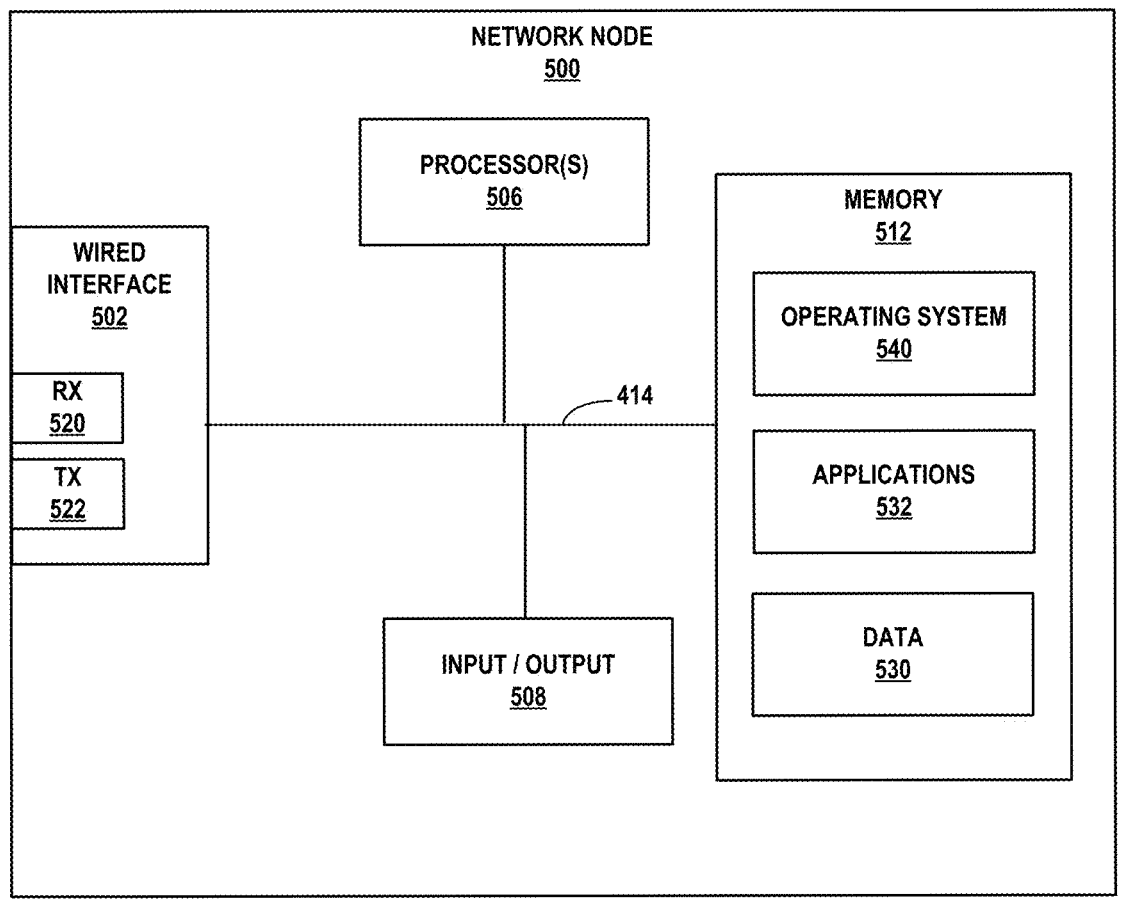
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server 110, DHCP server 116, DNS server 122, VNA 133, AP location module 135, Web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including data indicative of distances between APs, and/or operation related information such as registration request, AAA services, DHCP requests, Simple Notification Service (SNS) look-ups, and Web page requests). Communications interface 502 includes a transmitter 522, via which the network node 500 can send data and information (e.g., including location information, configuration information, authentication information, web page data, etc.).

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6A:
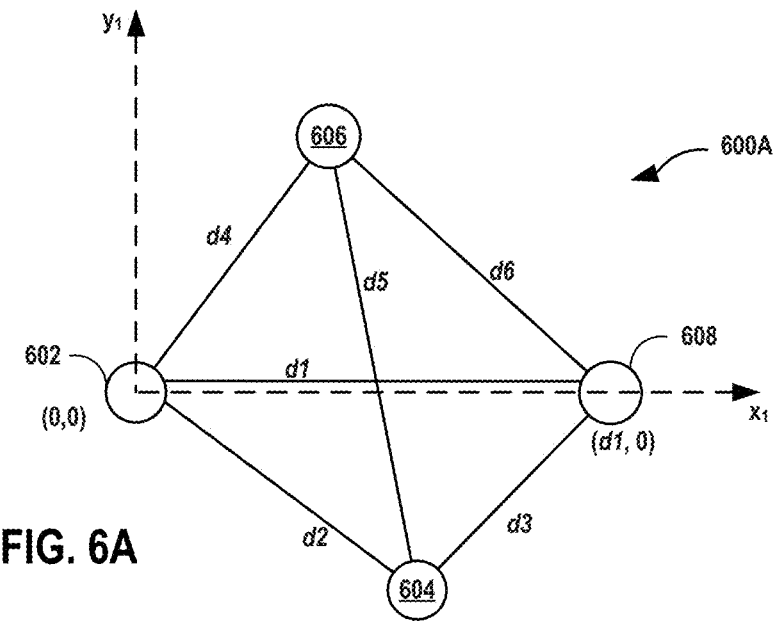
FIGS. 6A-6G are example network graphs illustrating use of robust quad relationships between the nodes to determine node coordinate locations, in accordance with the techniques described in this disclosure.

FIGS. 6A-6F are example network graphs illustrating use of robust quad relationships between the nodes to determine coordinates of nodes in a network graph, in accordance with the techniques described in this disclosure. As discussed above, the techniques of the disclosure utilize the concept of "robust quads" to minimize errors when determining locations (e.g., coordinates) of one or more nodes (e.g., APs or other computing devices) with respect to the location(s) of other nodes in the network graph. FIG. 6A shows an example network graph 600A including a robust quad comprised of four nodes 602, 604, 606 and 608 and six edges having known distances d1, d2, d3, d4, d5, and d6. In a wireless network example, the nodes may correspond to APs and the distances d1, d2, d3, d4, d5, and d6 between pairs of APs may be determined using round trip time (RTT) techniques, RSSI techniques, or any other technique to determine the distances between pairs of APs. The characteristic features of a robust four-vertex quadrilateral ("robust quad") are that each vertex (node) is connected to every other node by a known distance measurement (edge) and that knowing the locations of any three nodes is sufficient to compute the location of the fourth node using trilateration.

In the example of FIG. 6A, each node 602, 604, 606 and 608 is connected to every other node via one of the six edges. In a wireless network, for example, a node is considered "connected to" another node if the two nodes (e.g., APs) are neighbors of each other. One example method of detecting neighbor relationships between nodes in a wireless network is by using beacons to measure the round trip time (RTT) between APs. Two APs are considered to be neighbors if they can ping each other and determine the distance between the two APs based on the round trip ping exchange time. The 802.11mc protocol may be used to measure the round trip time (RTT) of the ping messages. The distances between the APs (derived from the RTT of the ping messages) are used to determine the distance between neighboring APs. In accordance with another example, two nodes are considered to be neighbors if a first node receives a signal from a second node at a strength, e.g., RSSI, greater than a predetermined value. The distances between the first and second APs are determined based on the strength of the signal transmitted from one AP and received by another AP. In this way, the distances d1, d2, d3, d4, d5, and d6 as shown in FIG. 6A may be determined. The network graph (stored as, for example, network graph data 138, 317) may be continuously updated to reflect changes to the neighbor relationships between the APs, movement of one or more APs to a different location, addition of new APs, removal of one or more APs, etc. After the absence of a predetermined number of successive beacons, for example, it may be concluded that a node is no longer a neighbor. Although specific examples of determining the distances between nodes using round trip time and/or RSSI techniques are described herein, it shall be understood that other methods of determining the distances between APs may also be used, and that the disclosure is not limited in this respect.

Localization based on robust quads helps to prevent incorrect realizations of ambiguities that would otherwise result in erroneous localization of one or more nodes. Because the nodes 602, 604, 606, and 608 form a robust quad, if the coordinate locations of at least three nodes and the distances to the unlocalized fourth node are known, then the coordinate locations of the fourth node can be determined (e.g., by trilateration) with minimal error and to remove the possibility of flip ambiguities.

Figure 6B:
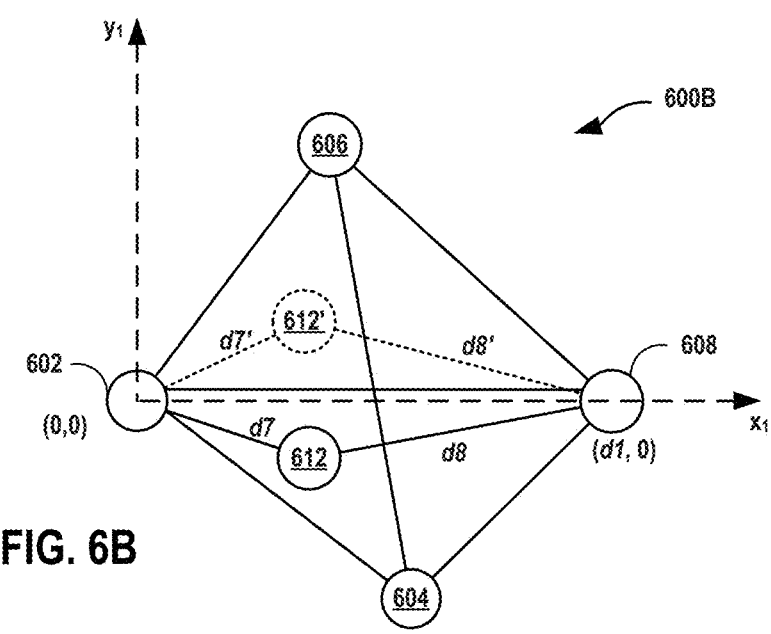

FIG. 6B shows an example of a flip ambiguity that can occur when a node is not a member of a robust quad. In FIG. 6B, node 612 is a neighbor of nodes 602 and 608 as indicated by two edges having distances d7 and d8. Node 612 is thus not a member of a robust quad. In this example, the location of node 612 can be flipped (i.e., reflected) over the edge d1 to a symmetric position 612' while the distance constraints d1, d7, and d8 remain the same. Accurate determination of the coordinates of node 612 therefore is uncertain due to the possibility of a flip ambiguity and incorrect localization at position 612'. Another kind of ambiguity that can result in erroneous localization computation when nodes are not members of a robust quad are discontinuous flex ambiguities (not shown), in which the removal of, e.g., edges d1 and d6 of a graph allows part of the graph to be flexed to a different configuration. By computing node locations based on robust quad relationships between the nodes, the techniques of the disclosure help to ensure that the localizations of nodes are correctly realized by reducing the likelihood of flip and/or discontinuous flex ambiguities.

As discussed above, in accordance with one or more techniques of the disclosure, AP location module 372 defines a local coordinate system for each local cluster based on three nodes that are members of an origin robust quad. The coordinates of the fourth node of the origin robust quad in the local coordinate system is determined by trilateration based on the coordinates of the other three nodes in the origin node. The coordinates of the remaining nodes in the local cluster in the local coordinate system are determined by trilateration based on the coordinates of the four nodes in the origin robust quad.

FIG. 6A shows an example of defining a first local coordinate system in accordance with one or more techniques of the disclosure. Assume nodes 602, 604, 606 and 608 are part of the origin robust quad (i.e., an anchor quad) for a local cluster. A first local coordinate system defined by axes ($x_1$, $y_1$) is defined based on three of the nodes in the origin robust quad, in this example, nodes 602, 606 and 608.

In some examples, the local coordinate system for each local cluster is defined based on three nodes in the origin robust quad according to the following rules:

(a) a first node (the origin node) is assigned local coordinates (0, 0);

(b) a second node is assigned local coordinates ($d_i$, 0), where $d_i$ is the known distance between the origin node and the second node in the positive x-direction; and (c) a third node is assigned local coordinates ($x_j$, $y_j$), where $y_j$ is a value in the positive y-direction, and wherein ($x_j$, $y_j$) are determined based on the coordinates of the origin node, the second node, the three distances between the first, second and third nodes and the cosine rule.

According to the rules described above, one of the nodes, node 602 in this example of FIG. 6A, is selected as the origin node and its location is defined as (0, 0) in the local coordinate system. The coordinates of node 608 are defined as (d1, 0) in the local coordinate system where d1 is in the positive x-direction and is the distance between nodes 602 and 608. A third node, node 606 in this example, of the origin robust quad is selected such that the y-coordinate is in the positive y-direction. The specific values of the x and y coordinates of the third node are determined based on the defined coordinates of nodes 602 and 608, the distances d1, d4, d6 and the cosine rule. The coordinates of the fourth node, node 606, of the origin robust quad are determined based on the coordinates of the three other nodes and the distances d2, d3, and d5 by trilateration.

Figure 6C:
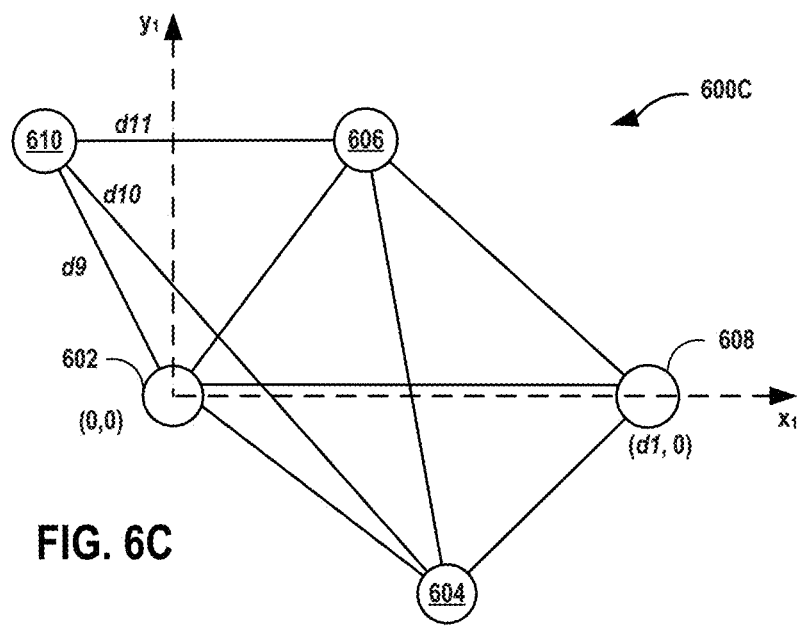
Figure 6D:
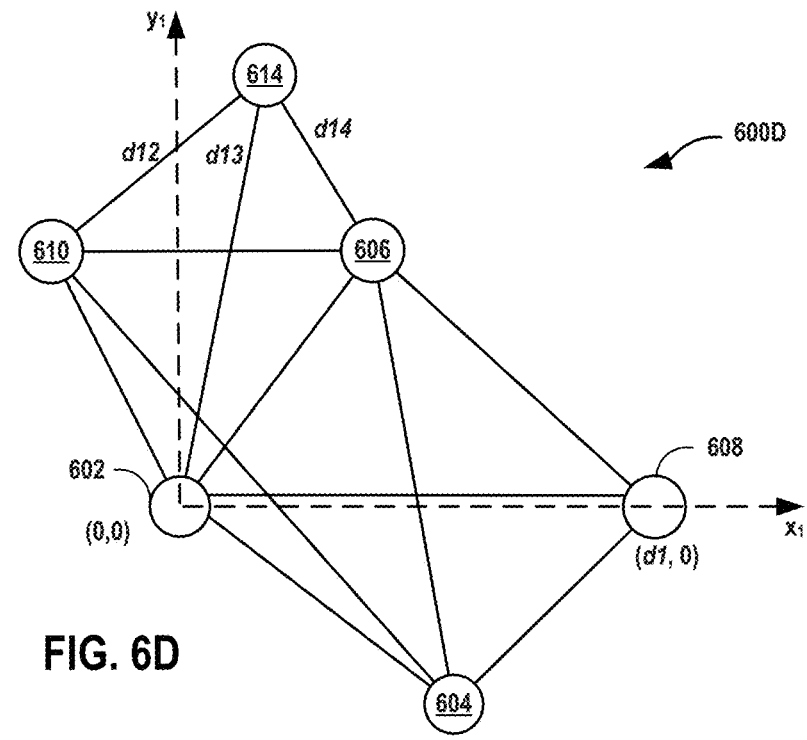
Figure 6E:
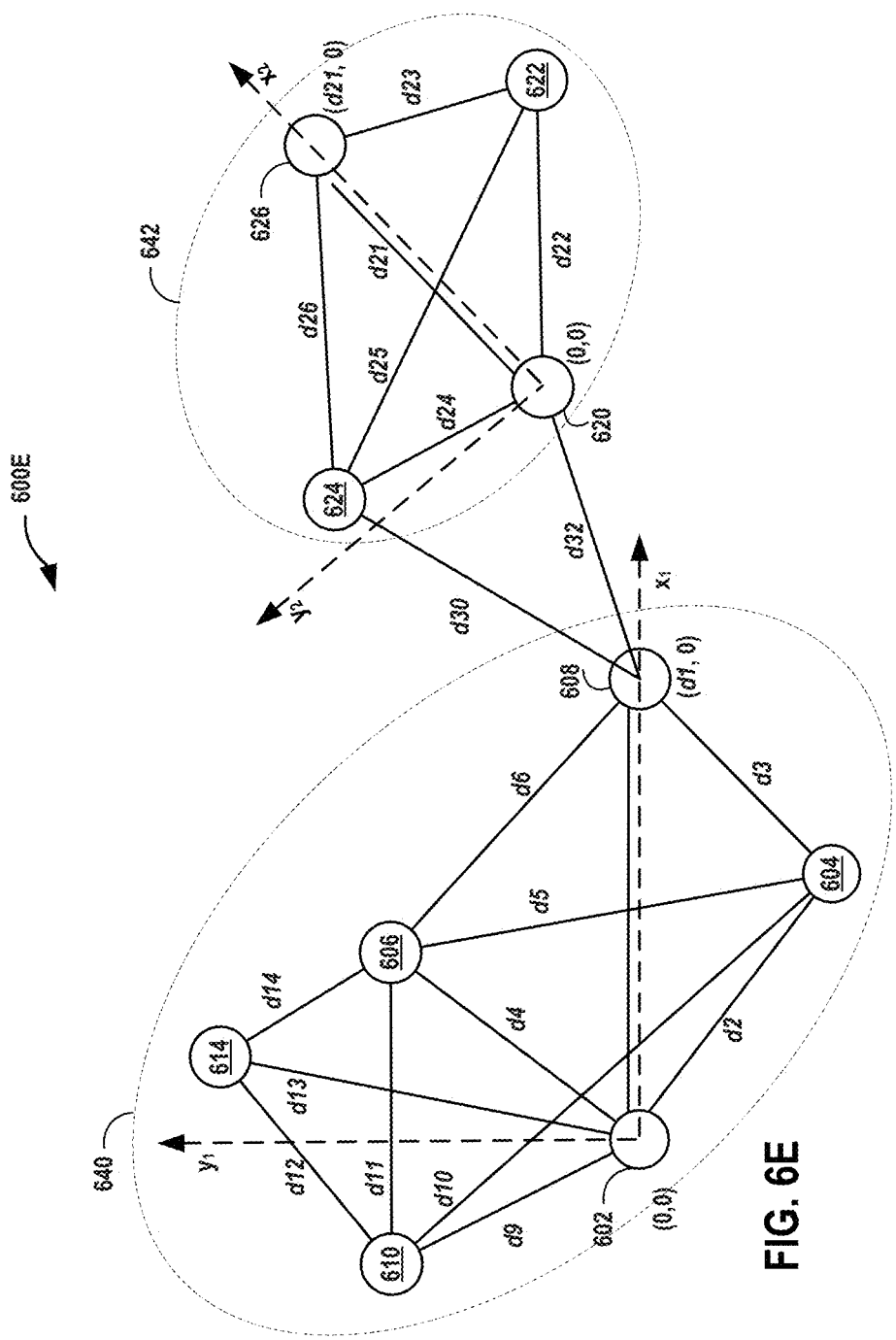
Figure 6F:
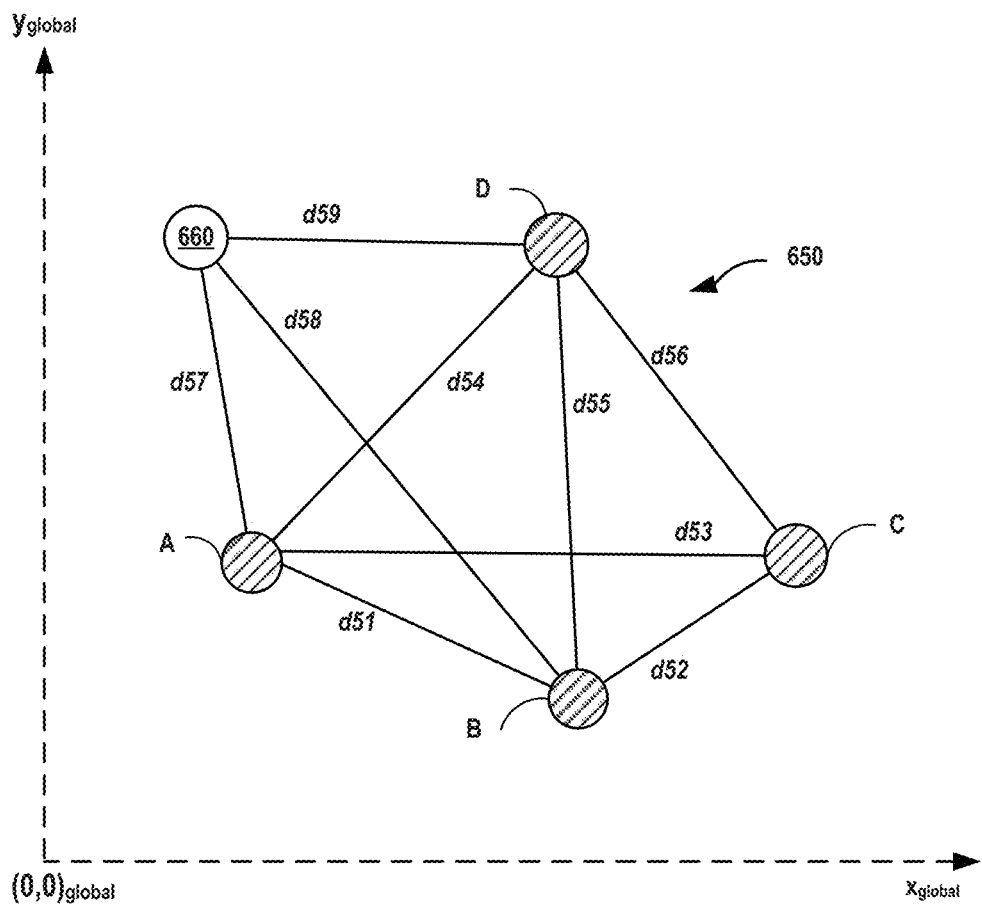
Figure 6G:
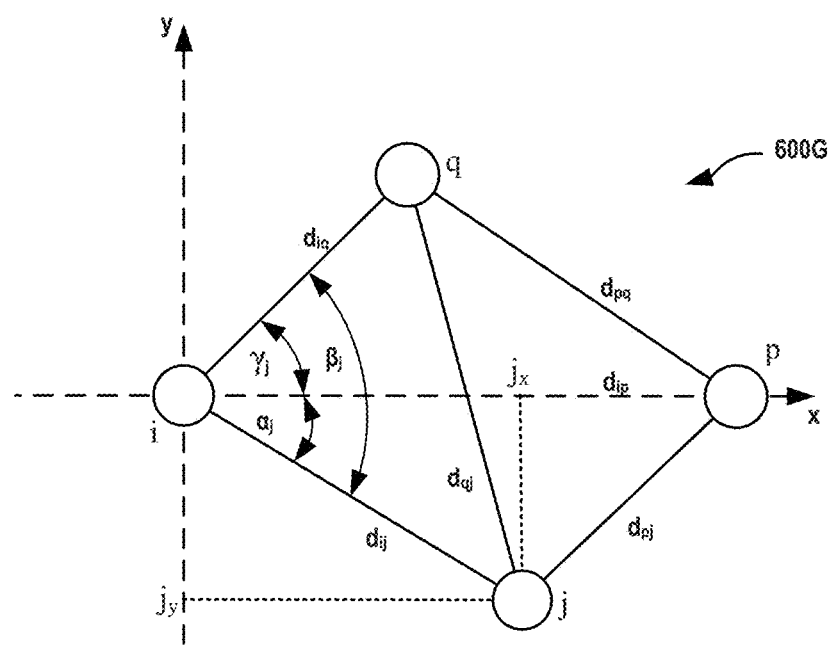

As another example, the NMS determines the coordinate locations of nodes in a robust square as illustrated with respect to the robust quad defined by nodes i,j,p,q as shown in the network graph 600G of FIG. 6G. The coordinates of the nodes i, p and q are:

$x_i=0$, $y_i=0$;
$x_p=d_{ip}$, $y_p=0$;
$x_q=d_{iq} \cos \gamma_j$, $y_q=d_{iq} \sin \gamma_j$
where $\gamma$ is the angle $\angle(p,i,q)$ in the triangle (p,i,q) and it is obtained by using a cosine rule for triangles:

$$\gamma_j = \arccos \frac{d_{iq}^2 + d_{ip}^2 - d_{pq}^2}{2d_{iq}d_{ip}} \qquad \text{Eq. 1}$$

The positions of the nodes j∈Ki,j≠p,q, for which the distances $d_{ij}$, $d_{qi}$, $d_{pj}$ are known, are computed by trilateration.

In some examples, the method determines the coordinate location of the fourth node of a robust quad, ($x_n$, $y_n$), by optimizing (minimizing) a cost function such as a Linear Least Squares (LLS) cost function as follows:

$$\text{LLS cost function}=(\Sigma_{i=1}{}^n(d_{ni}-\sqrt{(x_i-x_n)^2+(y_i-y_n)^2})^2 \qquad \text{Eq. 2}$$

where $x_i$, $y_i$ for i=1, 2, 3, are known coordinate locations of the other three nodes of the robust square, and $d_{ni}$ is the distance between the $n^{th}$ node and the $i^{th}$ node determined by, for example, RTT distance measurements.

FIG. 6C shows a network graph 600C showing an example of determining the coordinate location of a fourth node (node 610) of an overlapping robust quad to the origin robust quad (i.e., anchor quad) in accordance with one or more techniques of the disclosure. Nodes 602, 604, 606, and 610 form a robust quad (each node is a neighbor of every other node) that overlap (has three nodes in common) with the origin robust quad defined by nodes 602, 604, 606 and 608. In this example, the coordinate location of fourth node 610 in the first local coordinate system ($x_1$, $y_1$) can be determined based on the previously determined coordinate locations of the three other nodes 602, 604, and 606 in the robust quad and the distances d9, d10, and d1*l* using trilateration.

Similarly, FIG. 6D shows a network graph 600D in which nodes 602, 606, 610 and 614 form a robust quad (each node is a neighbor of every other node) that is overlapping with the robust quad including nodes 602, 604, 606 and 610. In this example, the coordinate location of the fourth node 614 in the local coordinate system ($x_1$, $y_1$) can be determined based on the previously determined coordinate locations of the nodes 602, 606 and 610 and the distances d12, d13, and d14 using trilateration as described above.

FIG. 6E shows a network graph 600E in which nodes 620, 622, 624 and 626 have been added to the network graph 600D of FIG. 6D. Nodes 620, 622, 624, and 626 form a robust quad (each node is a neighbor of every other node). Nodes 608, 624 and 620 are neighbors with each other via two edges having distances d30 and d32; however, they are not members of a same robust quad because a robust quad requires four nodes that are all neighbors with each other. In addition, none of nodes 620, 622, 624 and 626 have three neighbors in common with any of nodes 602, 604, 606, 608, 610 or 614. Thus, the locations of nodes 620, 622, 624, and 626 cannot be accurately determined in the first local coordinate system ($x_1$, $y_1$) because nodes 620, 622, 624, and

626 are not members of a robust quad with any of nodes 602, 604, 606, 608, 610 or 614. However, the locations of nodes 620, 622, 624, and 626 can be determined relative to each other because they are members of the same robust quad.

In accordance with one or more techniques of the disclosure, example network graph 600E is subdivided into two clusters 640 and 642, wherein all nodes in each cluster are members of a robust quad, and wherein each robust quad in the cluster has three nodes in common ("overlaps") with at least one other robust quad in the cluster. The coordinate locations of nodes in each cluster can be determined relative to each other. The NMS, and specifically the AP location module such as module 135 of FIG. 1 or deployed AP location module 372 of FIG. 3, defines a local coordinate system for each cluster, and determines the coordinate locations of each node in a cluster with respect to the local coordinate system defined for the cluster. For example, the NMS defines a second local coordinate system $(x_2, y_2)$ for cluster 642 according to the rules described above. In this example, a first node (node 620 in this example) is defined as the origin node (0, 0) and a second node (node 626 in this example) is defined at coordinate location (d21, 0) where d21 is the distance between nodes 620 and 626 in the positive x-direction, and a third node (node 624 in this example) is defined such that the y coordinate is in the positive y-direction and having coordinates determined based on the defined coordinates of nodes 620 and 626, the distances d24, d25, and d26 and the cosine rule. Based on the coordinate locations of nodes 620, 624 and 626 and the known distances d22, d23, and d25, the coordinates of fourth node 622 in the second local coordinate system $(x_2, y_2)$ are determined using trilateration.

For each successive overlapping robust quad the cluster 642 (although only one is shown for purposes of illustration), the location of the fourth node may be determined using trilateration based on the previously determined coordinate locations of the three common nodes. This process may be repeated for each cluster of robust quads identified in the network graph.

In general, for any network graph, the NMS, or more specifically AP location module 135/372, analyzes the neighbor relationships between nodes in the network graph and identifies one or more clusters of nodes wherein each node in a cluster is a member of at least one robust quad, and wherein each robust quad in the cluster has three nodes in common with another robust quad in the cluster. The NMS identifies one of the clusters as a global cluster and identifies an anchor robust quad in the global cluster as the robust quad having the largest number of overlapping robust quads. The NMS obtains known coordinate locations of at least three anchor nodes, or in some examples, all four anchor nodes, in the anchor robust quad. The NMS further defines a local coordinate system for each local cluster based on three nodes in an origin robust quad (i.e., anchor quad) for the local cluster according to the techniques described above. The NMS determines the coordinate locations of the fourth node in the origin robust quad using trilateration. The NMS localizes the fourth node of each subsequent overlapping robust quad based on the three known positions common to the two robust quads using trilateration. Constraining the computation of node locations to clusters of robust quads reduces the possibility of flip ambiguities and discontinuous flex ambiguities. It can also reduce the amount of error introduced for each node "hop" away from the origin node in a cluster.

Selecting the robust quad that overlaps with the largest number of other robust quads in the cluster as the origin robust quad for the cluster may help to minimize the error in the calculation of coordinate locations for the remaining nodes in the cluster, because the coordinate locations of the greatest number of nodes can be determined based on the coordinate locations of the nodes in the origin robust quad. With each "hop" to the next node along an edge away from the origin robust quad, the amount of error in the determination of the coordinate location can grow. In a network graph with tens, hundreds or even thousands of nodes, selecting an origin robust quad for each cluster that overlaps with the largest number of other robust quads in the cluster can help reduce the amount of error introduced into the location determination for all nodes in the cluster by minimizing the number of nodes that are more than one hop away from the origin node. With respect to the global cluster, selecting the robust quad that overlaps with the largest number of other robust quads in the global cluster helps to minimize the error in calculation of coordinate locations of the remaining nodes in the global cluster as the calculation is based on the known coordinate locations of at least three, and in some examples all four, nodes of the origin robust quad for the global cluster.

In the example of a wireless networking application, although the number and location of APs is dynamic in that one or more APs may be added, removed, or moved at various times, the location of the wireless network is generally fixed with respect to a specific building or site where the wireless network is installed. The actual coordinate locations of APs in a wireless network with respect to the building or site can be an important factor in wireless network installation, optimization, troubleshooting, diagnostics, location services, and other network monitoring and management functions.

In accordance with one or more techniques of the disclosure, the NMS determines the coordinates of each node in the network graph with respect to a global coordinate system. The global coordinate system has some fixed relationship with respect to a building or site where the one or more APs are installed to provide, for example, a wireless network. In this way, the NMS determines the coordinate locations of each node in the network in the global coordinate system and thus, for example, the coordinate location of each AP in the wireless network with respect to the global coordinate system and further with respect to site where the wireless network is installed.

FIG. 6F shows an example of a global cluster 650 including four anchor nodes A, B, C, and D having known coordinates in a global coordinate system in accordance with one or more techniques of the disclosure. As discussed herein, the NMS 130/300 defines one of a plurality of clusters as a global cluster for the site. In some examples, the global cluster is defined as the cluster having the largest number of robust quads in the cluster. At least three nodes (e.g., APs) in the global cluster are selected as anchor nodes. In some examples, four nodes are selected as anchor nodes. As described herein, one or more factors may be considered when selecting which nodes are to be the anchor nodes, or, in examples where 4 nodes are selected to be anchor nodes, the 4 anchor nodes may be part of a robust anchor quad.

For simplicity of illustration, the example of FIG. 6F shows a robust quad including the four anchor nodes A, B, C, and D and a robust quad including anchor nodes A, B, and D and (non-anchor) node 660; however, global cluster 650 would typically include a plurality of robust quads, and the disclosure is not limited in this respect. In this example, assume that the cluster 650 includes the largest number of robust quads among all the clusters and is therefore defined as the global cluster. Also assume for purposes of this example that all four nodes A, B, C, and D are anchor nodes.

The coordinate locations of the anchor nodes A, B, C, and D in the global cluster are measured with respect to a global coordinate system $(x_{global}, y_{global})$ for the site. Note that for the global cluster, the origin $(0, 0)_{global}$ is not necessarily defined with respect to a location of a node (e.g., AP) in the global cluster, rather, the origin of the global cluster is determined relative to the site at which the one or more APs are installed. In some examples, once the NMS 130/300 identifies the origin robust quad (and thus the nodes/APs belonging to the origin robust quad, i.e., anchor quad) for the global cluster, NMS 130/300 communicates the MAC address of the anchor nodes/APs to a network administrator for the site. The coordinates of the anchor APs specified in the communication are then measured with respect to the global coordinate system, such as by using GPS, laser measurement techniques, or by other direct observation or measurement techniques. The coordinates of the anchor nodes in the global coordinate system are thus known (as opposed to derived). For example, the coordinates of the anchor nodes A, B, C, and D in the global coordinate system may be $(x_A, y_A)$, $(x_B, y_B)$, $(x_C, y_C)$, $(x_D, y_D)$, respectively.

The global coordinates of the remaining nodes, e.g., node 660 etc., in the global cluster are determined successively by trilateration based on the known coordinates of the anchor nodes in the global coordinate system. For example, the coordinates of node 660 in the global coordinate system $(x_{global}, y_{global})$ are determined by trilateration based on the coordinates of anchor nodes A, B, and D and the distances d57, d58 and d59. Similarly, NMS 130/300 determines the coordinates of each successive unlocalized node in the global cluster by trilateration based on the determined coordinates of the other three nodes of the same robust quad and the distances between the unlocalized node and the other three nodes.

In accordance with one or more techniques of the disclosure, the NMS determines coordinate transformations (translation, rotation and/or reflection) between the global coordinate system and each local coordinate system. For example, the coordinate transformation between a global coordinate system for the global cluster and a local coordinate system for a local cluster are determined based on distance measurements (such as RTT measurements) between nodes in the global cluster and nodes in the local cluster.

Figure 7A:
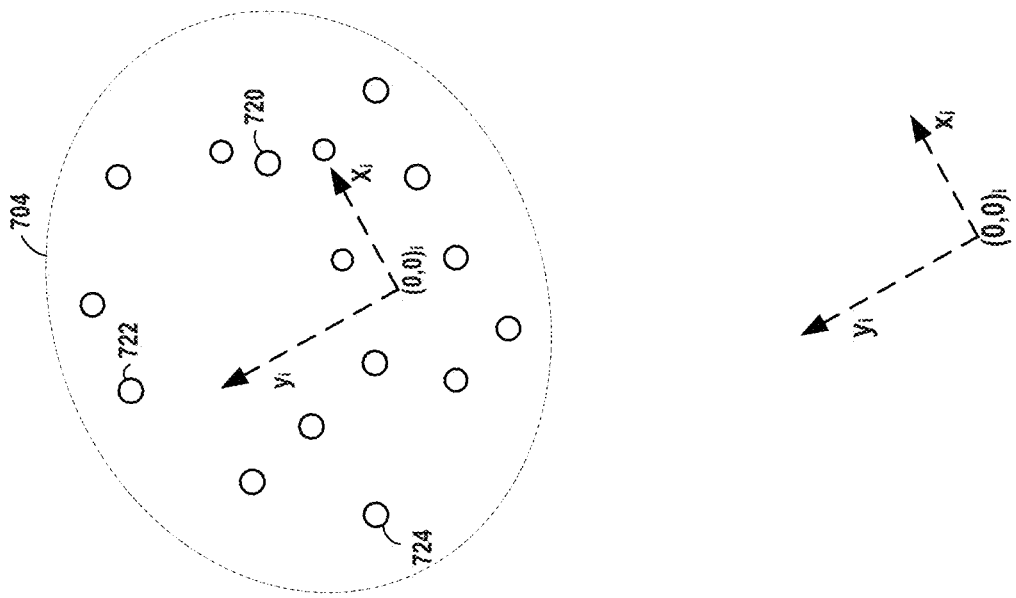
FIGS. 7A and 7B illustrates an example of a translation and a rotation to a global coordinate system for a global cluster of nodes from a local coordinate system for a local cluster of nodes, in accordance with one or more techniques of the disclosure.
Figure 7A:
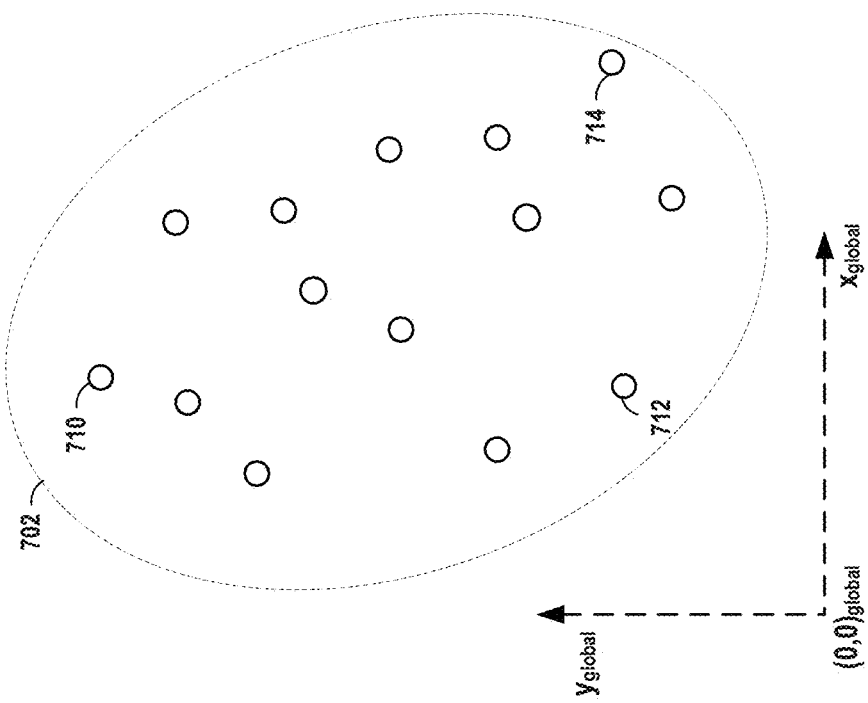
Figure 7B:
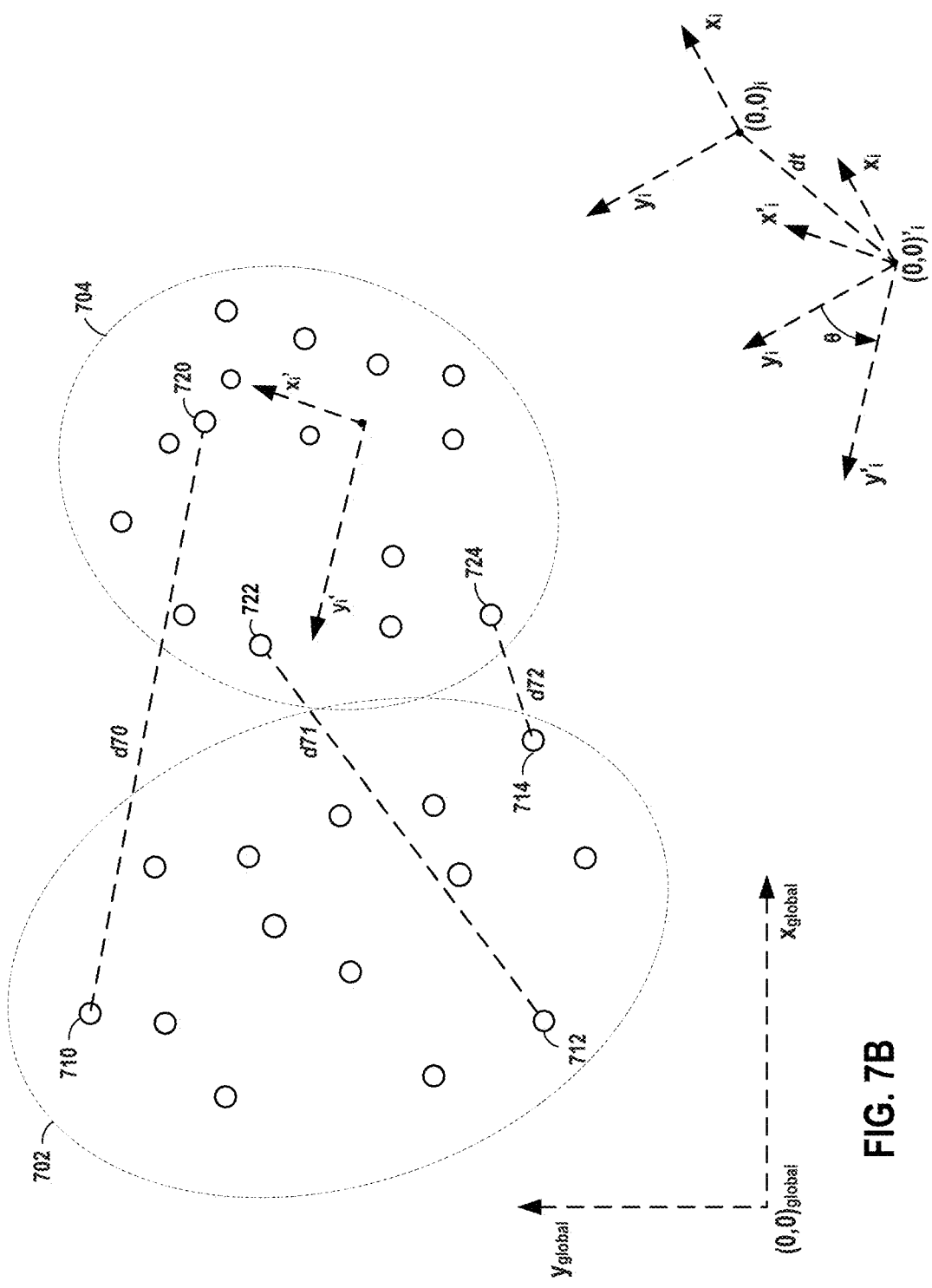

FIGS. 7A and 7B illustrate an example of a translation and a rotation from a local coordinate system $(x_i, y_i)$ for a local cluster of nodes 704 to a global coordinate system for a global cluster of nodes 702, in accordance with one or more techniques of the disclosure. The robust quad relationships between nodes in global cluster 702 and local cluster 704 are not shown in FIGS. 7A and 7B for simplicity of illustration.

As shown in FIG. 7A, the coordinates of each node of local cluster 704 are determined with respect to the local coordinate system $(x_i, y_i)$. The coordinates of each node of global cluster 704 are determined with respect to the global coordinate system $(x_{global}, y_{global})$ based on the locations of at least three anchor nodes as described herein.

In addition to the neighbor relationships (i.e., edges) between nodes in each of clusters 702 and 704 which define the robust quad relationships between the nodes in each cluster, the network graph also includes additional neighbor relationships between one or more nodes of global cluster 702 and one or more nodes of local cluster 704 that are not part of a robust quad that is a member of both clusters. In accordance with one or more techniques of the disclosure, the distances between pairs of nodes (based on, e.g., RTT measurements, RSSI measurements, etc.), are used to determine the translation, rotation, and/or reflection matrices between the global coordinate system and the local coordinate system.

For example, FIG. 7B shows local cluster 704 translated and rotated with respect to global cluster 702 based on three distances between three AP pairs. In this example, the distance measurements between nodes of first cluster 702 and nodes of second cluster 704 include distance measurement d70 between node 710 of global cluster and node 720 of local cluster 704, distance measurement d71 between node 712 of global cluster 702 and node 722 of local cluster 704, and distance measurement d72 between node 714 of global cluster 702 and node 724 of local cluster 704. The coordinate locations of nodes 720, 722 and 724 in global coordinate system and the distances d70, d71 and d72 between the pairs of nodes can be used to determine the translation, rotation, and reflection matrices from the local coordinate system to the global coordinate system.

Figure 7C:
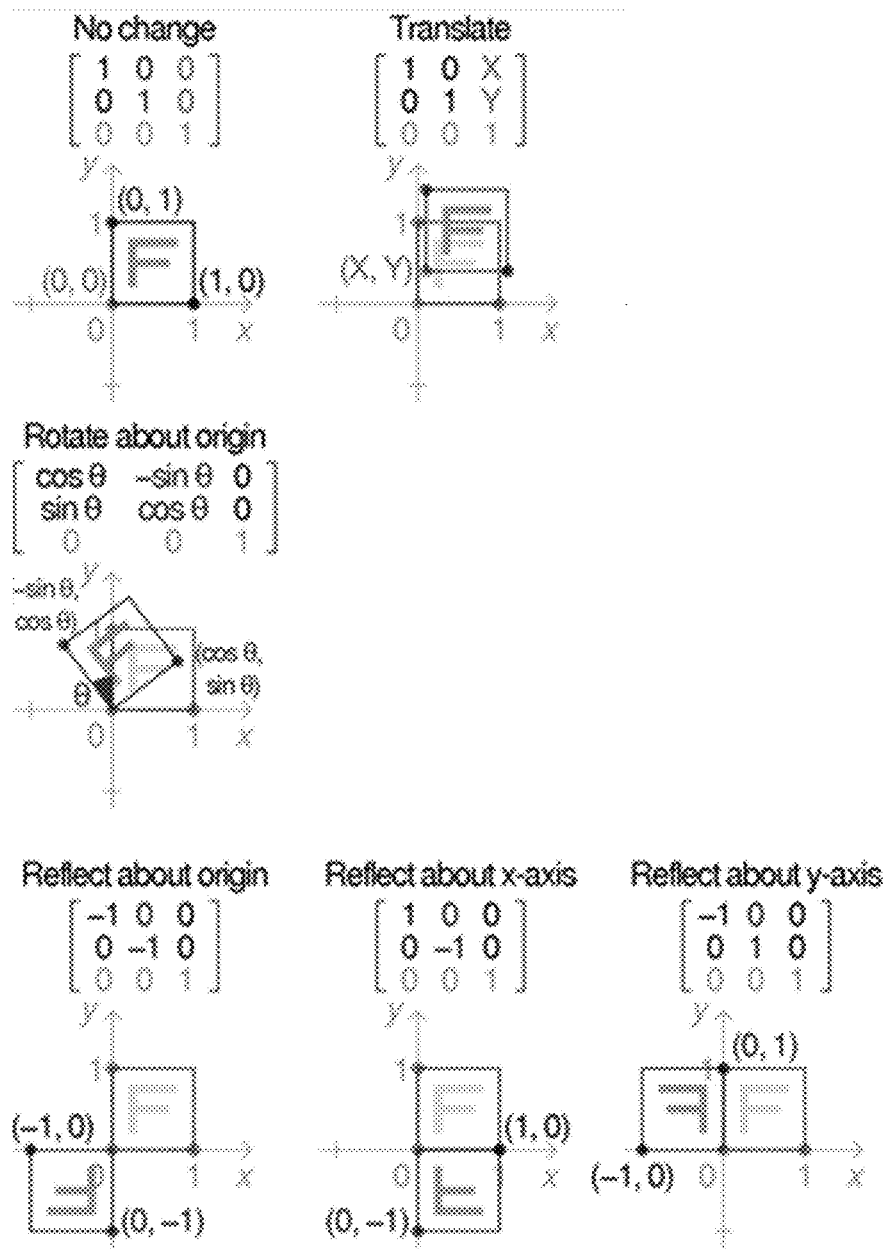
FIG. 7C show example translation, rotation and reflection matrices.

In some examples, to determine the transformation between local coordinate systems of different clusters, the NMS uses an optimization technique using rotation and reflection matrices to determine the transformation values/ factors between clusters. Example, translation, rotation and reflection matrices are shown in FIG. 7C.

In accordance with one or more techniques of the disclosure, all local clusters are transformed to the global coordinate system such that the coordinates of all nodes (e.g., APs) at the site are determined in the global coordinate system. In some examples, to perform the transformations, NMS 130/ 300 transforms the coordinates of the local clusters in an order determined by which local cluster is "nearest" to the global cluster. For each local cluster, NMS 130/300 determines a "distance" between the global cluster and the local cluster. For example, to determine the "distance" between the global cluster and a local cluster, NMS 130/300 may determine an average of one or more distances between nodes in the global cluster and nodes in the local cluster. In some examples, NMS 130/300 determines an average of all known distances between nodes in the global cluster and nodes in a local cluster to the determine the "distance" between the global cluster and a local cluster. NMS 130/300 determines which local cluster is the nearest local cluster based on the determined distances for each local cluster. The local cluster having the smallest "distance" to the global cluster is identified as the "nearest" local cluster, and the "nearest" local cluster is transformed to the global coordinate system.

Once the nearest local cluster is transformed to the global coordinate system, the nearest local cluster is merged with the global cluster to form a merged global cluster. Once again, the distance between the merged global cluster and each remaining local cluster is determined, and the nearest local cluster is transformed from the respective local coordinate system to the global coordinate system. The nearest local cluster is again merged with the global cluster, and the process repeats until all local clusters have been transformed from the respective local coordinate systems to the global coordinate system and merged with the global cluster. When all local clusters have been merged with the global cluster, the coordinate locations of all nodes (APs) at the site are determined with respect to the global coordinate system.

Figure 8A:
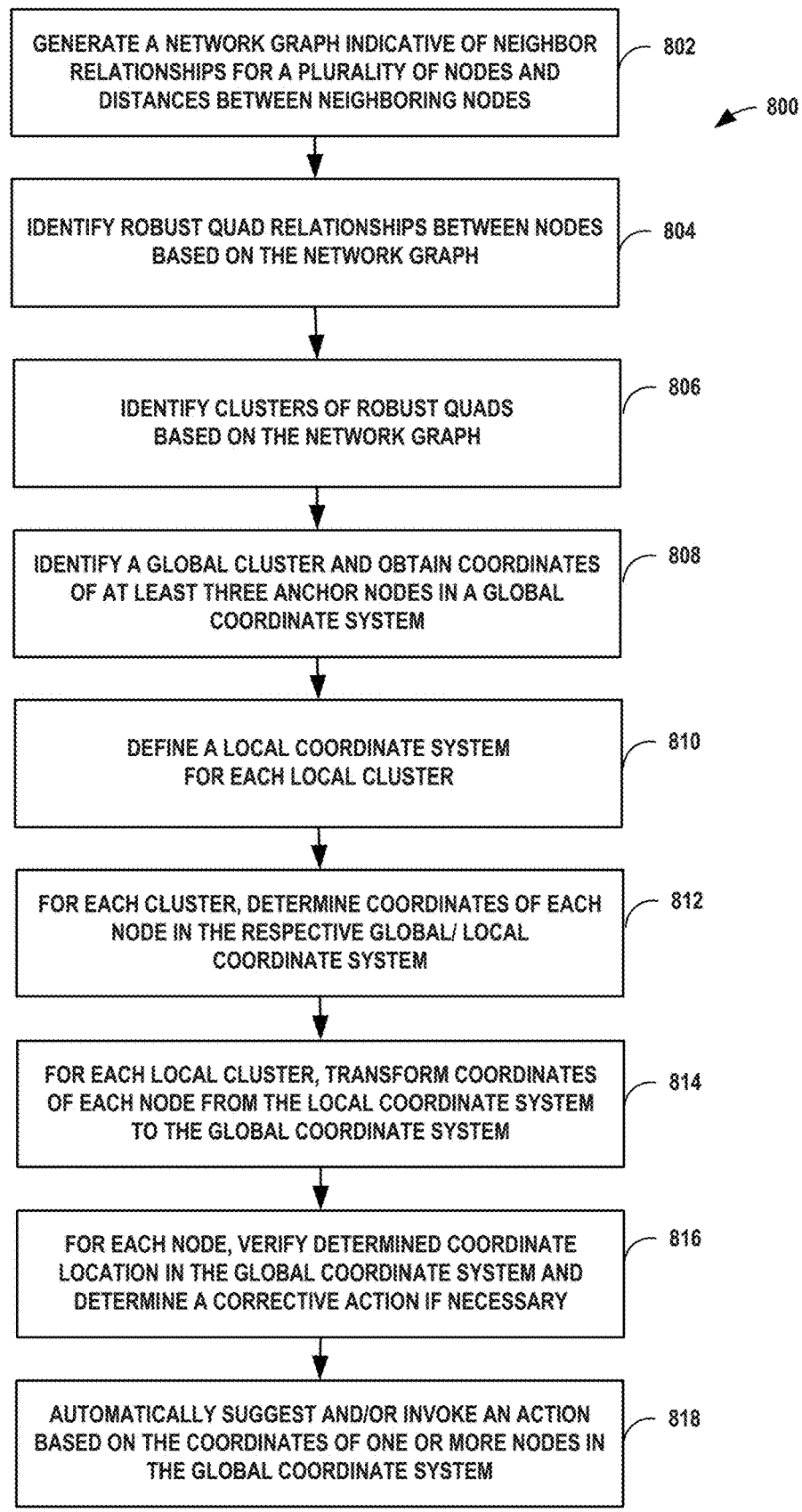
FIGS. 8A-8E are flowcharts of example processes by which a network management system determines locations of deployed APs, in accordance with one or more techniques of the disclosure.

FIG. 8A is a flowchart of an example process (800) by which a computing device may determine locations of nodes in a network, in accordance with one or more techniques of the disclosure. For example, the computing device may include one or more processor(s) of a network management system, such as processor(s) 306 of NMS 130/300 as shown in FIGS. 1A,1B and/or FIG. 3. In such examples, the nodes may include a plurality of APs, such as APs 142/200 as shown in FIGS. 1A and/or FIG. 2, or any other devices in a wireless network, such as wireless networks 106 as shown in FIGS. 1A and 1B. However, it shall be understood that the example of a wireless network is described herein for illustrative purposes only, and that the disclosure is not limited in this respect. In addition, although process (800) is described as being executed out by NMS 136/300, any computing device or group of computing devices, such as any one or more of APs 142/200, servers 128, network node 500 etc., may execute the functions described herein, and the disclosure is not limited in this respect.

The computing device builds a network graph indicative of neighbor relationships between a plurality of nodes (802). For example, the network graph may include a data structure, such as a network connectivity graph, including data that represents network connectivity between a plurality of APs in a wireless network. The network connectivity graph may include data indicative of neighbor relationships between the plurality of APs, including the distances between the neighboring APs.

The network graph may be represented by a data structure such as, for example, an adjacency list or a two-dimensional adjacency matrix, among other implementations. For example, NMS 136/300 may store the received RSSI information in a database such as network data 315 and may store the constructed network graph in a database such as network graph data 317 as shown in FIG. 3. However, it shall be understood that these are described for example purposes only, and that the disclosure is not limited in this respect.

The computing device analyzes the network graph to identify robust quad relationships between nodes in the network graph (804). For example, the computing device may use a breadth-first search (BFS) or a depth-first search (DFS) to traverse the network graph for robust quad relationships among the nodes. Various techniques may be used to avoid traversing a node more than once, such as a visited array or list, or other techniques.

The computing device analyzes the network graph to identify one or more clusters of robust quads in the network graph (806). A group of one or more robust quads may form a cluster wherein each node in the cluster is a member of a robust quad, and wherein each robust quad in the cluster has three nodes in common with another robust quad in the cluster. If a robust quad does not comply with these conditions, it does not belong to that cluster.

Figure 8B:
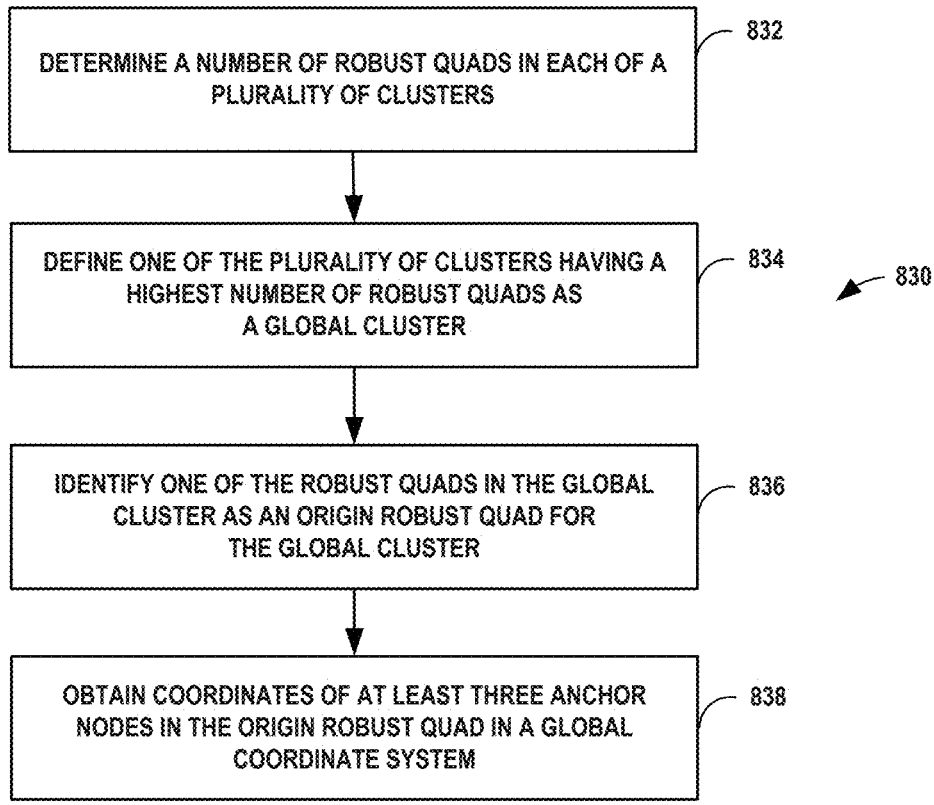

The computing device identifies one of the plurality of clusters as a global cluster and obtains coordinates of at least three anchor nodes in the global cluster in a global coordinate system (808). FIG. 8B is a flowchart illustrating an example process (830) by which a computing device, such as one or more processor(s) 306 of NMS 130/300, identifies a global cluster and determines which nodes in the global cluster to use as the anchor nodes, in accordance with one or more techniques of the disclosure.

The computing device determines the number of robust quads in each of the plurality of clusters in the network graph (832). The computing device defines one of the plurality of clusters having the largest number of robust quads as the global cluster (834). The computing device analyzes the network graph to identify the robust quad in the global cluster that overlaps (two robust quads are considered to overlap if they have three nodes in common) with the largest number of other robust quads in the global cluster (836). The robust quad that overlaps with the largest number of other robust quads in the global cluster is selected as the anchor robust quad.

The computing device obtains the coordinates of at least three nodes in the anchor robust quad (838). In some examples, the coordinates of all four nodes of the anchor robust quad are obtained. These nodes are referred to as the anchor nodes for the site. For example, the computing device (such as the NMS 130/300) may generate a notification including the MAC address of the anchor nodes and transmit the notification to a network administrator for the site. The coordinates of the anchor nodes in the global coordinate system are measured at the site, such as by using GPS, laser measurement techniques, or by other direct observation or measurement techniques. The measured coordinates are sent back to the NMS 130/300 and the coordinates of the anchor nodes may be stored in, for example, a database such as AP location data 139/319.

Figure 8C:
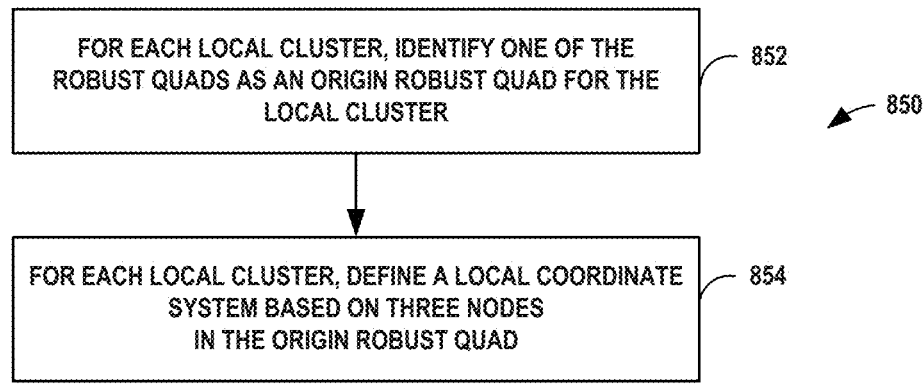

Referring again to FIG. 8A, the computing device defines a local coordinate system for each local cluster (810). FIG. 8C is a flowchart illustrating an example process (850) by which a computing device, such as one or more processor(s) 306 of NMS 130/300, defines a local coordinate system for each local cluster, in accordance with one or more techniques of the disclosure.

For each local cluster, the computing device identifies one of the robust quads in the local cluster as an origin robust quad (i.e., anchor quad) for the local cluster (852). To identify the origin robust quad, the computing device analyzes the portion of the network graph corresponding to the local cluster to identify the robust quad in the local cluster that overlaps with the largest number of other robust quads in the local cluster (836). The robust quad that overlaps with the largest number of other robust quads is selected as the origin robust quad for the local cluster.

For each local cluster, the computing device defines a local coordinate system based on three nodes in the origin robust quad (854). For example, the local coordinate system may be defined based on one or more rules for assigning a local coordinate system based on coordinates of three nodes of the origin robust quad as described herein.

Referring again to FIG. 8A, for the global cluster and for each local cluster, the computing device determines the coordinates of each node in the respective global or local coordinate system (812). For example, for the global cluster and for each local cluster, the computing device determines the coordinates of each successive fourth node of the overlapping robust quads by trilateration. For the global cluster, the computing device determines the coordinates of the fourth node of the anchor robust quad (if not measured) by trilateration based on the measured (known) coordinates of the other three nodes of the anchor robust quad and the distances to the fourth node to the other three nodes. The computing device then determines the global coordinates of the fourth node of each successive overlapping robust quad in the global cluster by trilateration. For each local cluster, the computing device first determines the coordinates of the fourth node of the origin robust quad (i.e., anchor quad) by trilateration based on the defined coordinates of the other three nodes of the origin robust quad, and then determines the local coordinates of the fourth node of each successive overlapping robust quad in the local cluster by trilateration.

Figure 8D:
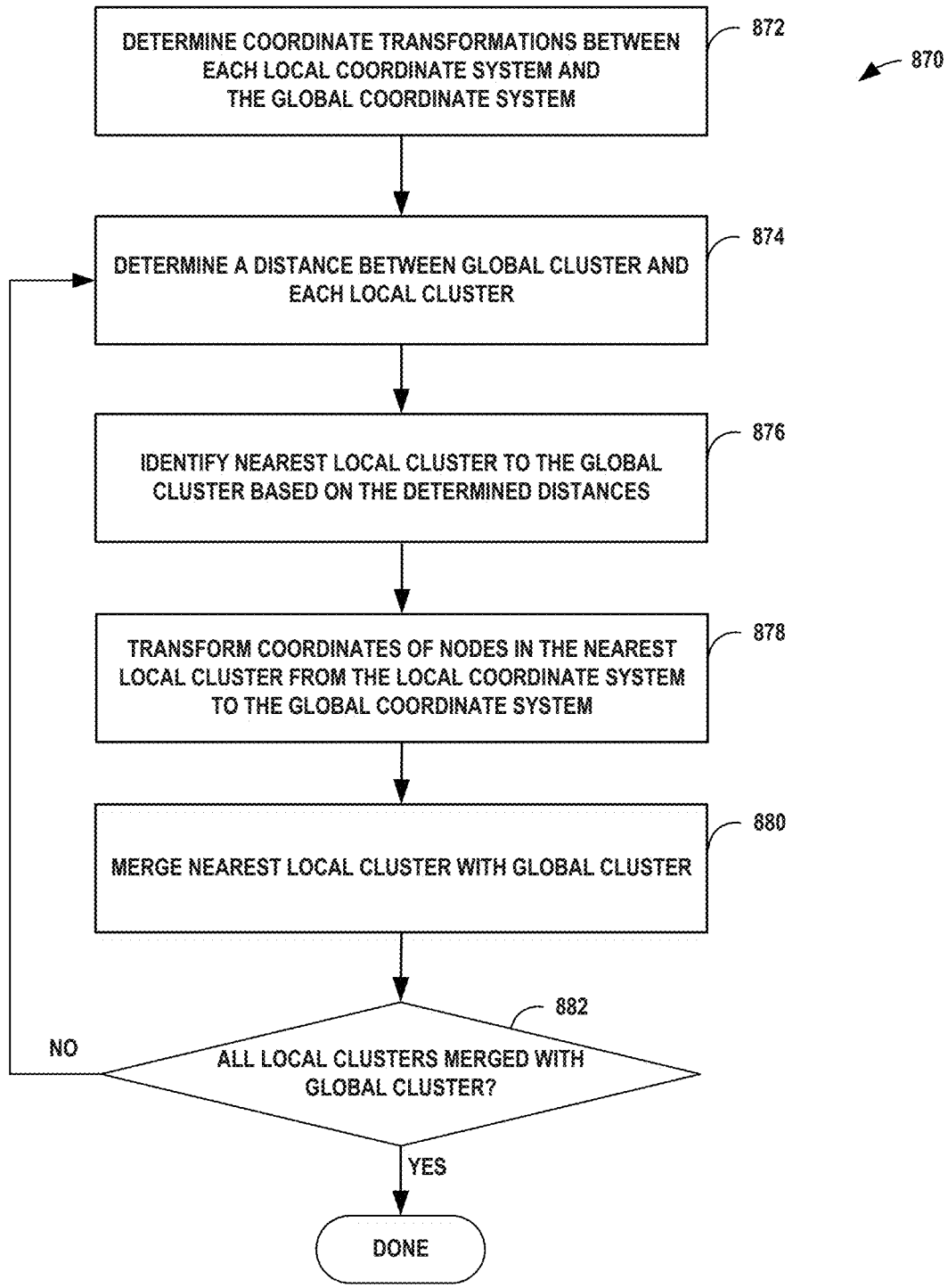

For each local cluster, the computing device transforms the coordinates of each node from the respective local coordinate system to the global coordinate system (814). FIG. 8D is a flowchart illustrating an example process (870) by which a computing device, such as one or more processor(s) 306 of NMS 130/300, transforms the coordinates of the nodes in each local cluster from the respective local coordinate system to the global coordinate system, in accordance with one or more techniques of the disclosure.

For each local cluster, the computing device determines a coordinate transformation between the local coordinate system for the local cluster and the global coordinate system (872). The coordinate transformation may include a translation, a rotation and/or a reflection determined based on distance measurements between pairs of nodes from each cluster. The distance measurements may include, for example, RTT based distance measurements, RSSI based distance measurements, etc., and may be stored in, for example, network graph data 138/317 as described herein. In some examples, the computing device may determine optimized translation, rotation, and/or reflection matrices between the local coordinate system and the global coordinate system based on at least three distance measurements between one or more nodes in the local cluster and one or more nodes in the global cluster. In some examples, the computing device determines translation, rotation and/or reflection matrices based on all available distance measurements between pairs of nodes, where a first node of each pair of nodes is a member of the global cluster and a second node of each pair of nodes is a member of the local cluster.

In the example process (870) of FIG. 8D, NMS 130/300 transforms the coordinates of the local clusters one at a time in an order determined based on which local cluster is nearest to the global cluster. For each local cluster, the computing device determines a distance between the global cluster and the local cluster (874). For example, to determine the distance between the global cluster and a local cluster, the computing device may determine an average of one or more distances between nodes in the global cluster and nodes in the local cluster. In some examples, the "distance" between the global cluster and a local cluster is an average of all available distance measurements between pairs of nodes, where a first node of each pair of nodes is a member of the global cluster and a second node of each pair of nodes is a member of the local cluster. NMS 130/300 identifies the local cluster that is nearest to the global cluster based on the determined distances for each local cluster (876). For example, the local cluster having the smallest determined distance to the global cluster is identified as the nearest local cluster. The computing device transforms the coordinates of nodes in the nearest local cluster from the local coordinate system to the global coordinate system (878). The computing devise merges the nearest local cluster with the global cluster (880). The computing device determines whether all local clusters have been merged with the global cluster (882). If any local clusters have not been merged with the global cluster (NO branch of 882), the computing device returns to step (874) and determines a distance between the merged global cluster and each remaining local cluster. The process repeats until all local clusters are merged with the global cluster (YES branch of 882). At this point, the coordinates of every node (e.g., AP) in the network graph has been determined in the global coordinate system. The computing device may store the global coordinates of each node in a database, such as AP location data 139/319.

Figure 8E:
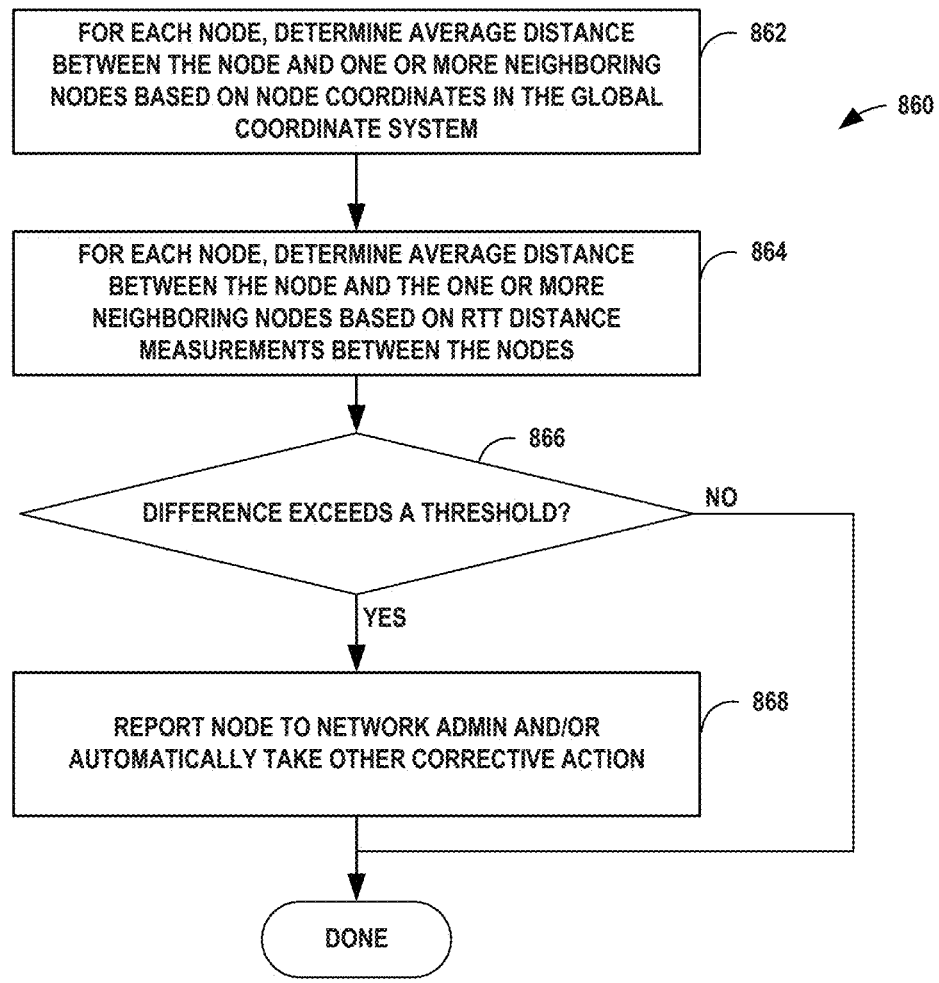

Referring again to FIG. 8A, the computing device further performs an error detection procedure by which, for each node, the determined coordinate location in the global coordinate system is compared with one or more measured distances between neighboring nodes (816). FIG. 8E is a flowchart illustrating and example process (860) by which a computing device (such as NMS 136/300) may perform an error detection procedure in accordance with one or more techniques of the disclosure. For each node, the computing device determines the average of the distances between the node and one or more of its neighboring nodes based on the coordinates of the nodes (862). The computing device further determines an average of the distances between the node and one or more of its neighboring nodes based on the distances (e.g., RTT based distance measurements) between the nodes (864). These average distances are compared (866) and, if the difference exceed a verification threshold (YES branch of 866), the coordinates of the node are determined to be insufficiently accurate, and an appropriate action is taken (868). In some examples, the determined coordinates of the node may be removed from the AP location data, or the coordinates of the node may be indicated as undetermined. In some examples, the identity (e.g., a MAC address) of the inaccurately localized node is communicated to a network administrator so that one or more corrective or remedial actions, such as manual measurement of the node location, inspection of the environment for potential causes of wireless signal interference, etc., can be performed. In some examples, corrected coordinates for the node may be automatically determined based on the measured distance(s) between the node and one or more of its neighboring nodes. In this way, if the automatically determined coordinates of a node do not sufficiently match the measured distances due to errors introduced during the optimization of the coordinate locations, a network administrator may be notified so that corrective action may be taken, or a corrected coordinate location of the node in the global coordinate system may be automatically determined. If the comparison does not exceed the verification threshold, the coordinate locations of the node are determined to be sufficiently accurate (NO branch of 866).

Referring again to FIG. 8A, the computing device may further automatically suggest and/or invoke an action based on the coordinates of one or more nodes in the global coordinate system (818). As one example, the computing device may generate data representative of a user interface (UI) for display, such as user interface elements representing one or more of a plurality of AP devices at a site and the corresponding coordinate locations of one or more of the plurality of APs at the site. For example, the UI may include a map of the site and one or more user interface elements indicative of each AP at its location relative to the site.

In some examples, the user interface elements representing the APs may be color coded to indicate the status of the location determination for each AP. For example, an AP may be color coded with a first color (e.g., yellow) to indicate that the localization for that AP has not been performed. The at least three anchor APs maybe color coded a second color (e.g., blue) to visually identify the anchor APs from among the other APs at the site and to provide a visual indication of the absolute locations of the anchor APs at the site. Once the automatic localization of an AP has been performed, the AP may be color coded a third color (e.g., green) to visually indicate the successful automatic localization of that AP. Upon completion of an error detection procedure, an AP may be color coded a fourth color (e.g., red) to visually indicate an improper localization of the AP, to indicate that the localization for that AP has not been finalized, and/or to indicate that manual remedial or corrective action should be taken with respect to that AP. In examples where the computing device is able to automatically address or correct the erroneous localization, the AP may be color coded the third color (e.g., green) to visually indicate successful localization of the AP.

As another example, the computing device may analyze the locations of one or more of the plurality of APs at the site and generate a notification indicative of whether the deployment of APs at the site (in other words, the locations at the site where the APs were installed) is acceptable for purposes of wireless network performance. For example, the computing device may analyze the locations of one or more of the plurality of APs at the site and generate a notification informing a network administrator that the deployment is acceptable/successful, that one or more of the APs should be moved to a different location, and/or that one or more APs should be added at a particular location(s), etc., in order to optimize the wireless network at the site.

As another example, the computing device may analyze the locations of one or more of the plurality of APs at the site to automatically adjust the transmit power and/or channel selection of one or more of the plurality of APs with respect to each other in order to optimize the wireless network at the site.

As another example, the computing device may analyze the locations of one or more of the plurality of APs at the site to determine a root cause(s) of poor network performance or an error condition, and/or to determine whether to automatically invoke a remedial action intended to address the root cause(s). If the computing device determines that a remedial action to the root cause cannot be automatically invoked, the computing device may generate a notification indicative of one or more suggested remedial actions that may be taken by a network administrator to address the root cause(s).

As another example, the computing device may utilize the locations of one or more of the plurality of APs at the site to provide location services to one or more wireless client devices (e.g., smart phones, tablet computers, IoT devices, etc.) associated with the wireless network. The location services may include, for example, any one or more of wayfinding, location-based proximity notifications, asset tracking, etc. The computing device may also provide location-based analytics to a network administrator or other user that derive insights from client mobility through the premises.

As other examples, the computing device may further monitor and/or utilize the locations of one or more of the plurality of APs at the site for the purposes of wireless network installation, optimization, troubleshooting, diagnostics, location services, and any other network monitoring and management functions.

Figure 9:
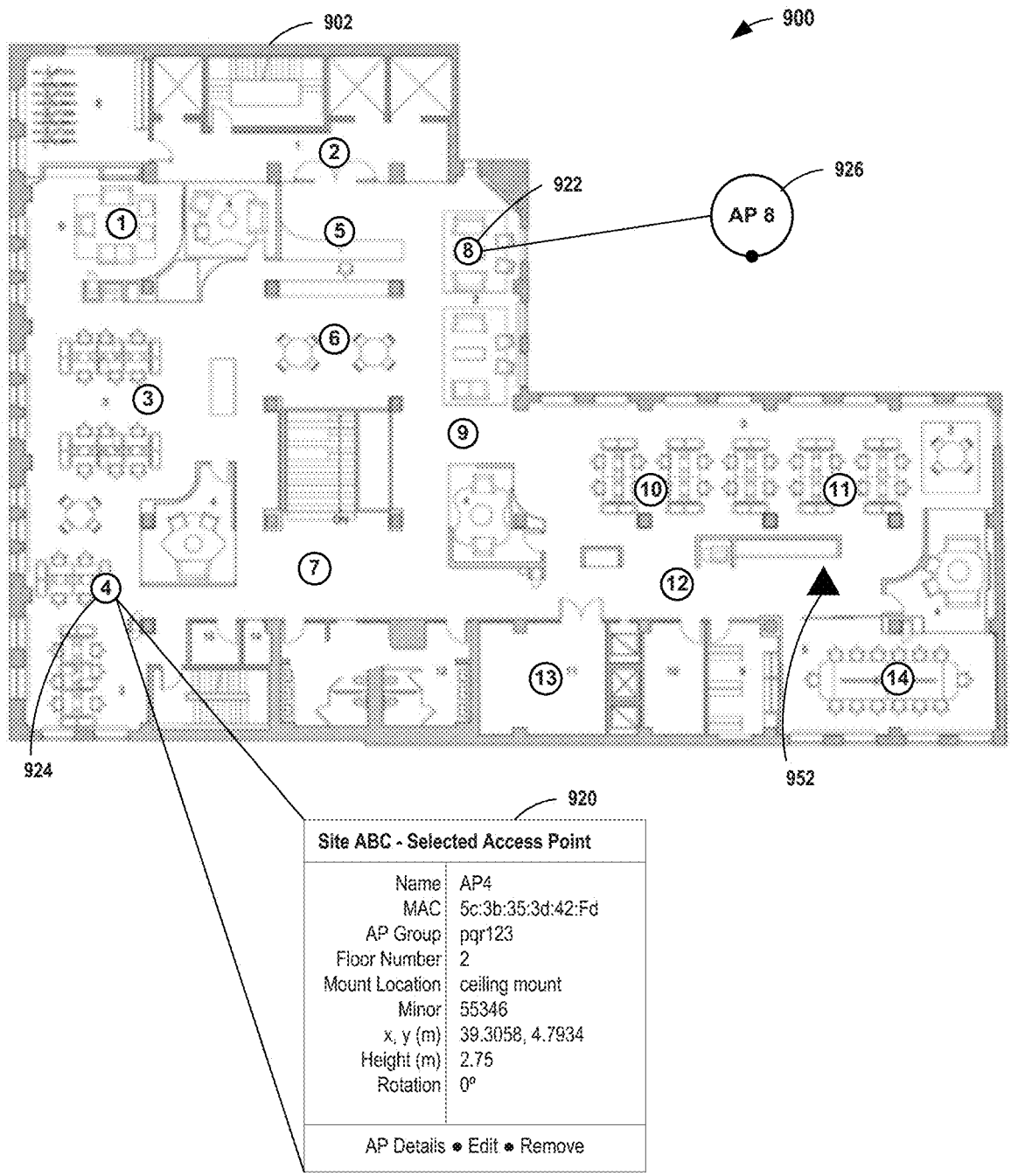
FIG. 9 shows an example map of a site that may be displayed on a user interface of a computing device, in accordance with one or more techniques of the disclosure.

FIG. 9 shows an example map 900 of a site that may be displayed on a user interface of a computing device, in accordance with one or more techniques of the disclosure. In this example, the site includes a structure such as an office building at which one or more APs are deployed to provide one or more wireless networks. In this example, map 900 includes a floor plan 902 of the site and one or more user interface elements, such as user interface element 922, indicative of each AP, AP1-AP14, at its determined coordinate location relative to the floor plan 902. In some examples, automatic determination of coordinate locations for one or more APs is performed by NMS 130/300 executing AP location module 135/372 as shown in FIG. 1A, 1B, or 3 as described herein. Floor plan 902, including dimensions and other specifications of the floor plan 902, may be retrieved from, for example, site map data 321 as shown in FIG. 3, which includes floor plans corresponding to one or more structures at each of the sites. Site map data 321 also maps the floor plans with respect to the global coordinate system for the site. To generate map 900, the computing device automatically places one or more user interface elements corresponding to one or more deployed APs on the floor plan 902 based on their automatically determined coordinate locations.

Although for simplicity example map 900 shows fourteen APs AP1-AP14, in some examples, a site may include hundreds or even thousands of APs deployed over multiple floors of a multi-floor structure, or deployed over multiple structures and/or outdoor areas (such as a stadium or other outdoor or partially outdoor area). The disclosure is therefore not limited with respect to the number of APs whose location can be automatically determined or with respect to the number of APs that can be automatically placed and displayed on one or more maps, such as map 900 of FIG. 9. The disclosure is further not limited with respect to the type of site that may be displayed on one or more maps.

Although example map 900 shows a floor plan 902 of a single floor of a structure at the site, in some examples one or more maps of a multi-floor structure including one or more user interface elements indicative of deployed APs at their respective floor locations in a multi-floor structure may also be generated. In such examples, map 900 may include a floor plan for each floor of a multi-floor structure and user interface elements indicative of each AP at its determined coordinate location relative to the specific floor on which the AP is deployed. In some examples, the maps of each floor along with their respective APs in their determined coordinate locations may be displayed simultaneously, such as in a perspective side view of a multi-floor structure, to provide users with an overall view of the AP deployment at the site. In addition or alternatively, maps of two or more selected floors may be displayed side by side. In addition or alternatively, a map of each specific floor of a multi-floor structure may be displayed individually, such as shown in FIG. 9. In some examples, the user interface includes one or more user interface elements which, when selected by a user, cause a map of a selected floor and the APs deployed on that floor to be displayed, or cause a map of one or more selected floors of the multi-floor structure to be displayed. Thus, although a specific example of one floor map including locations of one or more deployed APs is shown in FIG. 9, the disclosure is not limited in this respect.

Map 900 includes one or more interactive user interface elements corresponding to each of the plurality of APs, denoted AP1-AP14. For example, user interface element 922 corresponds to AP8 and user interface element 924 corresponds to AP4. Each user interface element 922, 924, etc. may include, for example, a rotatable virtual knob, such as rotatable virtual knob 926 shown for AP8, placed on map 900 such that user interface element reflects the determined location, orientation, and/or floor information of the corresponding AP with respect to the site. A small dot on the circumference of rotatable virtual knob 926 may in some examples indicate the angle of orientation (i.e., rotation) of the respective AP with respect to a coordinate system for the site.

In some examples, map 900 may further include one or more interactive user interface elements, such as user interface element 952, corresponding to each of a plurality of wireless client devices present at the site and displayed on map at a current location of the wireless device with respect to the floor plan of the site 902. The wireless client devices may include mobile devices such as smart phones, tablet computers, laptop computers, etc., IoT devices such as printers, items of inventory, sensors, or equipment being tracked, sensors, wireless tags, etc., or any other type of wireless client device. In accordance with one or more techniques of the disclosure, the location of the wireless client devices, such as wireless client device associated with user interface element 952, may be determined based on the automatically determined location(s) of one or more APs, such as one or more of AP1-AP14, at the site.

In accordance with one or more techniques of the disclosure, the computing device automatically determines location information including coordinate locations for one or more APs deployed at a site. In some examples, the location information for each AP further includes floor information indicative of a specific floor number of a multi-floor structure on which each individual AP is deployed. The computing device may further generate for display on a computing device the floor information for each individual AP. Example techniques for determining floor information for one or more deployed APs are described in U.S. Provisional Patent Application No. 63/363,353, filed Apr. 21, 2022, and entitled "Systems and Methods of Determining Floor Locations of Deployed Access Points," which is incorporated by reference herein in its entirety.

In some examples, user interface elements, such as user interface elements 922, 924, are user selectable. For example, in response to receipt of a selection of a user interface element for a specific AP, the computing device may display information corresponding to the selected AP. In FIG. 9, for example, in response to selection of user interface element 924 corresponding to AP4, the computing device generates a text box or sub-window 920 including information corresponding to AP4 for display on a user computing device. Sub-window 920 may include, for example, the name of the AP (e.g., "AP4"), the MAC address of the AP, the name of an AP group with which the AP is associated (e.g., "pqr123"), the floor number with which the AP is associated (e.g., "2"), the mount location or type of mount for the AP (e.g., "ceiling mount"), the x, y coordinate location of the AP (e.g., "39.3058, 4.7934"), the height of the AP (e.g., "2.75 m"), and the rotation or orientation of the AP with respect to a coordinate system for the site (e.g., "0°").

In some examples, user interface elements representing the APs or group(s) of one or more APs may be color coded to indicate the status of the location information for each AP or group of APs. For example, an AP or group of APs may be color coded with a first color to indicate that the location information for the AP or group of APs has not been determined. The anchor APs or anchor group of APs may be color coded a second color to visually identify the anchor APs or anchor group of APs from among the other APs at the site. Once the location information for an AP and/or group of APs has been automatically determined, the AP and/or group(s) of APs may be color coded a third color to visually indicate that location information for that AP and/or group(s) of APs has been successfully automatically determined.

As described herein, in accordance with one or more techniques of the disclosure, a computing device (such as NMS 133/300 and/or AP location module 135/372 shown in FIGS. 1A, 1B, and 3) identifies robust quad relationships between a plurality of nodes. For example, based on a network graph representing neighbor relationships between a plurality of nodes, and based on distances between neighboring nodes, the computing device identifies robust quad relationships between the nodes. The network graph(s) may be stored in, for example, network graph data 138/317. Each robust quad comprises four nodes wherein each node is a neighbor of every other node in the robust quad. Two nodes are considered to be "neighbors" if they are able to communicate with each other, so that the distance between each pair of nodes is known (e.g., based on recorded FTM data/round trip time (RTT) measurements).

In some examples, in order to qualify as a robust quad, a quad (set of four APs) must include one or more features. As mentioned above, there must be recorded distance data between each of the node within the quad (that is, each node must be a neighbor of every other node in the robust quad). In examples where the distances between APs is measured using FTM/RTT techniques, this effectively means that all APs within the quad must be within range to record FTM distances.

In addition, in some examples, in order for a quad to qualify as a robust quad, all triangles that can be created by the nodes within the quad must be robust. A triangle is considered robust if all of its constituent angles exceed a minimum value ($d_{min}$) that is defined by the following equation:

$$x \sin^2\theta \geq d_{min} \qquad \text{Eq. 3}$$

where
x=the smallest distance side of triangle ABC, and
θ=the angle opposite side x In some examples, a default value of $d_{min}$ is set such that the probability of a flip ambiguity is less than, for example, 10%. For example:

$$\text{Default } d_{min} = 3\sigma_{RTT} \qquad \text{Eq. 4}$$

where
$\sigma_{RTT}$=standard deviation of the RTT measurements error.

However, any appropriate default value for $d_{min}$ may be selected, and the disclosure is not limited in this respect. In some examples, the value of $d_{min}$ may be further refined based on the topology of the network. For example, in accordance with one or more techniques of the disclosure, the computing device utilizes machine learning techniques, such as hyperparameter tuning, to fine-tune the $d_{min}$ value. These techniques are described further herein below.

As described herein, in accordance with one or more techniques of the disclosure, the computing device identifies clusters of nodes wherein each node in a cluster is a member of at least one robust quad, and wherein each robust quad in the cluster has at least three nodes in common with another robust quad in the cluster. In some examples a connected-quad graph may be used to create quad clusters which represent connected robust quads. Within each cluster, all the robust quads share 3 nodes with the other nodes in the cluster (that is, all robust quads in a cluster are 3-overlapped). Each cluster is then localized relative to itself (in a local coordinate system).

In some examples, the algorithm to create the graph of overlapped quad connections uses a space hungry implementation that takes advantage that the nodes in a quad are sorted in ascending order. A hash-map of all possible three overlaps is created. Each quad has 4 possible ascending combinations of 3 nodes, where the nodes are numbered 1, 2, 3, and 4: (123, 124, 134, and 234). These combinations are created into hash-map keys which index into a slice of quads. For example quad [1, 2, 3, 4] in a map with 10 nodes would yield keys 10203, 10204, 10304, 20304 and quad [1, 2, 3, 5] would yield keys 10203, 10205, 10305, 20305. If the slice contains quads, each of these becomes a connection in the final quad graph. The quad is then appended to the slice. This implementation allows to skip any overlap checking as the hash-map key effectively is the index to all possible three overlapped quads. In the previous example quads [1,2,3,4] and [1,2,3,5] both share the index 10203. Thus when processing both quads will be added to the slice at 10203 and be added to the robust quad graph as connections.

After creation, the robust quad graph contains all overlaps between each robust quad. The clusters of the connected components can now be found with a depth first graph traversal. A cluster contains only the quads that are 3-overlapped and chained one after another. Each cluster can have a length of 1 to n where n is the total number of robust quads. Assume in a cluster quad 'm' is not 3-overlapped with quad 'n' but between them there are 'm-n' quad available which they are 3-overlapped.

After the clusters have been created, the algorithm iterates through the list of clusters to establish an origin robust quad (i.e., anchor quad on which to base the localization of nodes in the network).

In accordance with one or more techniques of the disclosure, the origin robust quad (i.e., anchor quad) of a cluster is the quad most ideal to begin localization of that cluster's constituent nodes (e.g., APs in a wireless networking example). The anchor quad includes the anchor nodes whose coordinate locations are used as a basis to determine the coordinate locations of the other nodes in the cluster. With the goal of reducing the geometric dilution of precision, one or more factors may be considered when selecting the anchor quad/anchor nodes. In some examples, the anchor nodes belong to a robust quad which overlaps (e.g., has 3 nodes in common) with the largest number of other robust quads in the cluster. In some examples, the anchor nodes belong to a robust quad having the most "square-like" shape; that is, a robust quad in which the distances of each of the four "sides" of the robust quad are substantially equivalent or closest to being equivalent. In some examples, the anchor nodes belong to a robust quad having a relatively larger perimeter (e.g., the sum of the distances of the four "sides" of the robust quad); that is, the anchor nodes belong to a robust quad having a relatively larger overall "size" as compared to other of the robust quads. In some examples, a score is assigned to each robust quad based on one or more of these factors, and a robust quad is selected based at least in part on the score.

Figure 10C:
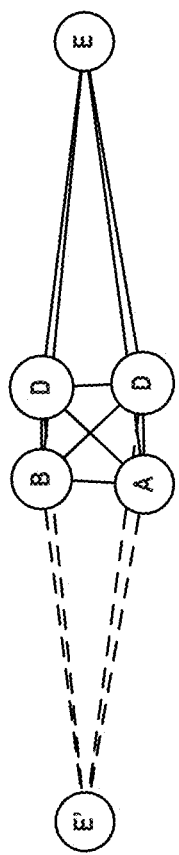
FIGS. 10A-10D show example robust quads with respect to selection of an anchor quad in accordance with one or more techniques of the disclosure.
Figure 10D:
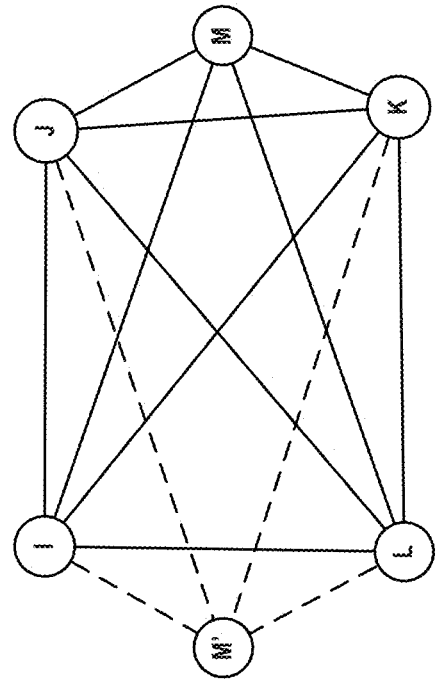
Figure 10A:
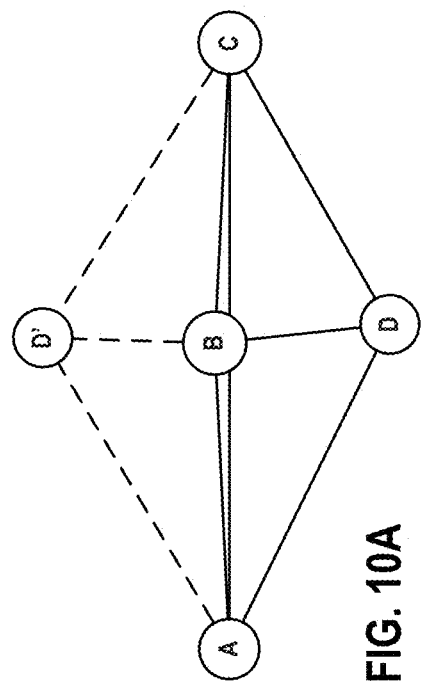

In some examples, when selecting the anchor nodes, the techniques of the disclosure seek to identify a robust quad (the anchor quad) for a cluster which is as "square" as possible. This quality reduces the likelihood of flip ambiguities, helping when localizing nodes in a network, helping to ensure that there are no distances that can be invalidated by measurement error. As shown in FIG. 10A, assume that nodes A, B, and C are selected to determine the location of node D. In this example, nodes A, B, and C are arranged almost linearly with respect to each other. To determine the location of node D, there is a relatively high likelihood of placing D at location D' if ABC are selected as anchors for trilateration. This is because the distances AD≈AD', CD≈CD' and BD≈BD'.

Figure 10B:
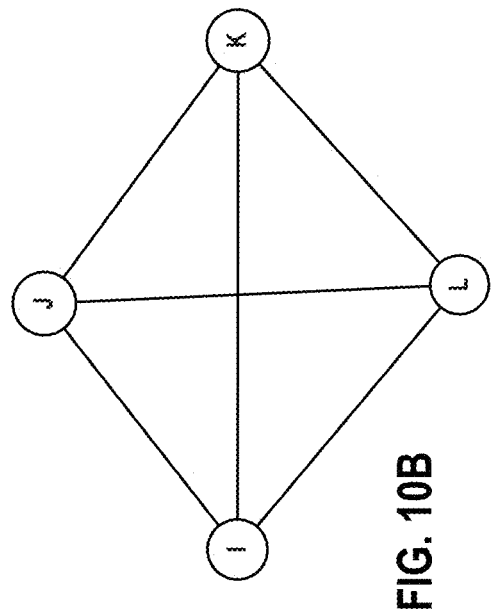

As shown in FIG. 10B, assume that nodes I, J, and K are selected as a basis for to determine the location of node L. Quad IJKL does not have the same problem exhibited by quad ABCD. In these examples, quad IJKL (the relatively more "square" quad) is a relatively better choice for an anchor quad as compared to quad ABCD (the relatively less "square" quad). In general, one factor which may be considered when selecting anchor quads is the relative "squareness" of the quad. In some examples, robust quads that are relatively more "square" are better choices for an anchor quad as compared to robust quads that are relatively less square.

In some examples, when selecting the anchor nodes, the techniques of the disclosure seek to identify an anchor quad for a cluster having a relatively larger "size" as compared to other robust quads in the cluster. A larger quad has a lower chance of creating flip ambiguities across the entire quad. As shown in FIG. 10C, for example, for robust quad ABCD, when localizing point E there is a probability of E being localized to E' depending on the measurement error. As shown in FIG. 10D, for example, it is less likely for flip ambiguity to occur across IJKL (the relatively larger quad) when determining the location of node M, as the larger distance between nodes would likely be much larger than the measurement error. The node-node differences are relative larger between M and M'. Additionally, it is likely that most other nodes will reside within the area demarcated by IJKL and the location of these other nodes can thus be determined more accurately. Although both quads ABCD and IJKL of FIGS. 10C and 10D are relatively "square," in this example, quad IJKL may be a better selection for an anchor quad as compared to quad ABCD. In some examples, a robust quad in which one "side" is relatively larger compared to the largest side of the other robust quads is one criterion which may be considered when selecting the anchor quad.

In some examples, when selecting the anchor nodes, the techniques of the disclosure takes into account the number of three overlapping connections (3 nodes in common) for each robust quad. A greater number of three overlapping connections allows the anchor quad to localize more points against a high quality quad allowing for more accurate node localization in the first pass. Because the amount of error grows through each pass, it is generally most effective to determine the location of (i.e., localize) the maximum number of nodes on the first pass.

In some examples, the anchor selection is based on a score assigned to each robust quad in the cluster. The score for each robust quad takes into account one or more of these factors. For example, a score taking all three of these factors into account may be given by the following equation:

$$\text{Score} = d_{max} \times \hat{n} \times \left(\frac{d_{smallest}}{d_{largest}}\right)^2 \times \left(\frac{d_{AB}}{d_{max}}\right)^2 \times \left(\frac{d_{BC}}{d_{max}}\right)^2 \times \left(\frac{d_{CD}}{d_{max}}\right)^2 \times \left(\frac{d_{DA}}{d_{max}}\right)^2 \quad \text{Eq. 5}$$

where $\hat{n}$=numConnections/maxConnections (a normalized number of connections, where numConnections is the number of connections (3 common nodes) for the robust quad and maxConnections is the number of connections for a robust quad having a maximum number of connections)

$d_{max}$=max(max($d_{AB}$, $d_{BC}$), max($d_{CD}$, $d_{DA}$)), (scale by the largest side)

$d_{smallest}$=min($d_{AC}$, $d_{BD}$), (smallest diagonal)

$d_{largest}$=max($d_{AC}$, $d_{BD}$), largest diagonal

The first term of the example score equation ($d_{max}$) scales the score by a factor of the distance of the largest side of the robust quad, such that robust quads having a relatively larger $d_{max}$ will have a relatively higher score than robust quads having a relatively lower $d_{max}$. The second term of the example score equation ($\hat{n}$), scales the score by a normalized number of connections for the robust quad. The third term of the example score equation considers the "squareness" of the robust quad. For a substantially "square" robust quad, the distances $d_{AC}$≈$d_{BD}$; thus, the value of the third term for a perfectly square robust quad is "1," and the value of the third term decreases as the squareness of the robust quad decreases, causing a corresponding decrease in the overall score for less square robust quads.

Although a specific example score equation is described herein, it shall be understood that other equations for assigning a score to a robust quad for purposes of determining one or more anchor nodes could also be used, and that the disclosure is not limited in this respect. The example score described herein is one way to consider the factors discussed above, and other equations and/or factors may also be considered in the score. In addition, in some examples, weights may be applied to one or more one of the terms, or other means to give more or less weight to one or more of the terms may be applied, and the disclosure is not limited in this respect.

In some examples, the robust quad with the highest score is selected as the anchor quad. This anchor selection algorithm also allows us to select the n best quads as many quads can score comparably to the highest scoring quad depending on map size. This allows some flexibility in selection of the anchor quad so that convenience and/or cost associated with manually measuring coordinate locations of the anchor nodes can be considered when selecting the anchor nodes.

In another example, the anchor nodes are selected to be in the center of a network cluster so as to minimize the cumulative error of determining the location of each node layer away from the anchor nodes. For example and without limitation, the computing device may determine anchor nodes based on algorithms such as the betweenness centrality, weighted betweenness centrality, Percolation centrality, etc., may be used to determine how close to the center of a network cluster a node is.

Once the anchor nodes are selected (e.g., the anchor robust quad is identified), to localize the nodes in the graph the techniques of the disclosure start from the anchor nodes and then proceed to localize outward one node at a time. In order to select the next best node to localize we create a graph of all connected robust quads. A robust quad is connected to another if both quads share three overlapping nodes. In this way, a localized quad may be used to localize all connected quads one after another via trilateration as the three anchor nodes are known. When two robust quads share 3 overlapping nodes, after the first quad is localized the second quad can be localized as trilateration needs only 3 known points. In some examples, in order to increase the accuracy of the localization even more accurate, the 4th node from the first quad may also be used in trilateration procedure.

Each cluster has an origin or anchor robust quad selected for it via, for example, the anchor selection process outlined above. This origin robust quad servers as the origin of the cluster for purposes of the determining the locations of the other nodes in the cluster. An example of assignment of an anchor quad with coordinates in the local coordinate system of the cluster) and the localization process is shown and described herein with respect to FIGS. 6A-6E.

In the connected graph example, the anchor quad is selected as the starting node in the connected quad graph of three overlapped quads. The cluster then undergoes breadth first graph traversal across its three overlapped quads. The fourth point of these neighbor quads is found via a fourth point optimization function. In some examples, an LLS (linear least squares) optimization method and Nelder-Mead Technique is used to minimize the cost function. The fourth point optimization function utilizes trilateration optimization to quickly find the best guess for the location of the fourth point of a given quad to reduce the possibility of flip ambiguity. By the end of this step, each cluster has been localized within its own local coordinate system (e.g. as shown in FIG. 6E).

After each cluster has been localized in a local coordinate plane the largest cluster is selected as residing in global space. Each smaller cluster is localized in reference to this largest cluster's position and rotation. The smaller clusters are selected by order of cluster-cluster distance where the target cluster is the cluster with the smallest mean node-node distance between it and the global cluster.

After the target cluster is selected, it must then be merged into the largest cluster. Conversion of the local coordinate plane of target cluster into the largest cluster can be done by either Rotation, Reflection and Translation or combination of them. To achieve this localization two matrices are created. Rotation and Reflection matrices plus translation. The simple 2-D reflection and Rotation matrices are defined as below:

$$Rot(\theta) = \begin{bmatrix} \cos\theta & -\sin\theta \\ \sin\theta & \cos\theta \end{bmatrix}$$

$$Ref(\theta) = \begin{bmatrix} \cos 2\theta & \sin 2\theta \\ \sin 2\theta & -\cos 2\theta \end{bmatrix}$$

and the combination of these two can be result in two different cases as below:

Rot(θ) Rot(ϕ)=Rot(θ+ϕ),
Ref(θ) Ref(ϕ)=Rot(2θ−2ϕ),
Rot(θ) Ref(ϕ)=Ref(ϕ+½θ),
Ref(θ) Rot(ϕ)=Ref(ϕ−½θ).

The translation across x, y coordinates can be added as the 3rd column with some constant values. As the rotation and reflection on coordinate systems but not the points thus the system uses the inverse of the matrices mentioned above.

These two matrices (rotation and reflection) are calculated by running an optimization problem (e.g., LLS) and correcting the matrix values until they match the translation/rotations/reflections of all nodes on each cluster. The cost function uses distance between each node against the calculated distance by the node-node pair after transformation as a score to optimize the matrix. Any nodes in common between the two clusters automatically have a measured distance of 0.

In some examples, to determine if only rotation or a combination of rotation and reflection has occurred the optimization problem creates two different cost functions related to these two scenarios. The answer with the minimum value for the cost function is selected.

At this point the transformation parameters have been calculated and then used to transform every point (node) on the target cluster to the global cluster. The target cluster's nodes are added to the global cluster and the step repeats until all clusters have been merged into the global cluster. By the end of this merge step, the coordinate locations of most of the nodes are determined and reside in the global cluster. Any node that started without any robust quads may remain unlocalized as they do not belong to any original cluster. In some examples, these nodes are then handled by the second phase of the algorithm as described below.

In some examples, the determined coordinate locations of one or more nodes (e.g., APs) in the wireless network as determined using the example process described with respect to FIGS. 8A-8E are adjusted during a second localization phase and/or a third localization phase. In an example second localization phase, a current determined coordinate location of each node is verified based on an RMS (Root Mean Square) of the location error for each node. The Root Mean Square Error between two nodes is the delta (difference) between the measured distance (e.g., the distance measured using RTT/FTM techniques), $d_{ftm}$, and the calculated distance between the node and the anchor node (e.g., based on the determined coordinate location of the node and the anchor node) squared. Assuming some number of known node locations, the computing device calculates the RMS Error for one unknown node by averaging these squared deltas and taking the square root of the average as follows:

$$RMS \text{ Location Error} = \sqrt{\frac{1}{n}\sum((d_{ftm} - dist(x_{unknown}, x_{anchor}))^2)} \qquad \text{Eq. 6}$$

During the second localization phase, after computing the RMS location error for each node, the computing device selects a node during a first iteration. In some examples, the selected node is the node having the highest RMS location error. During the first iteration, the computing device re-computes the coordinate location of the selected node with respect to the original anchor nodes by trilateration using the known coordinates of the original anchor nodes. The RMS location error for the re-localized node is then re-computed. If the RMS location error for the re-localized node is less than a threshold value, the re-localized node is added to a list of anchor candidate nodes along with the original anchor nodes to be used for re-localizing the remaining nodes during subsequent iterations of the procedure. If the RMS location error for the re-localized node is not less than the threshold value, the computing device does not add the re-localized node to the list of anchor candidate nodes and selects a next node for a next iteration. During each iteration, the computing device re-computes the coordinate location of the selected node (e.g., the node having the highest RMS location error) for that iteration using the coordinate locations of the original anchor nodes plus any anchor candidate nodes added to the list of anchor nodes during the previous iterations. The second localization phase repeats until all nodes within a communication range have been localized to within a margin of error.

Figure 11A:
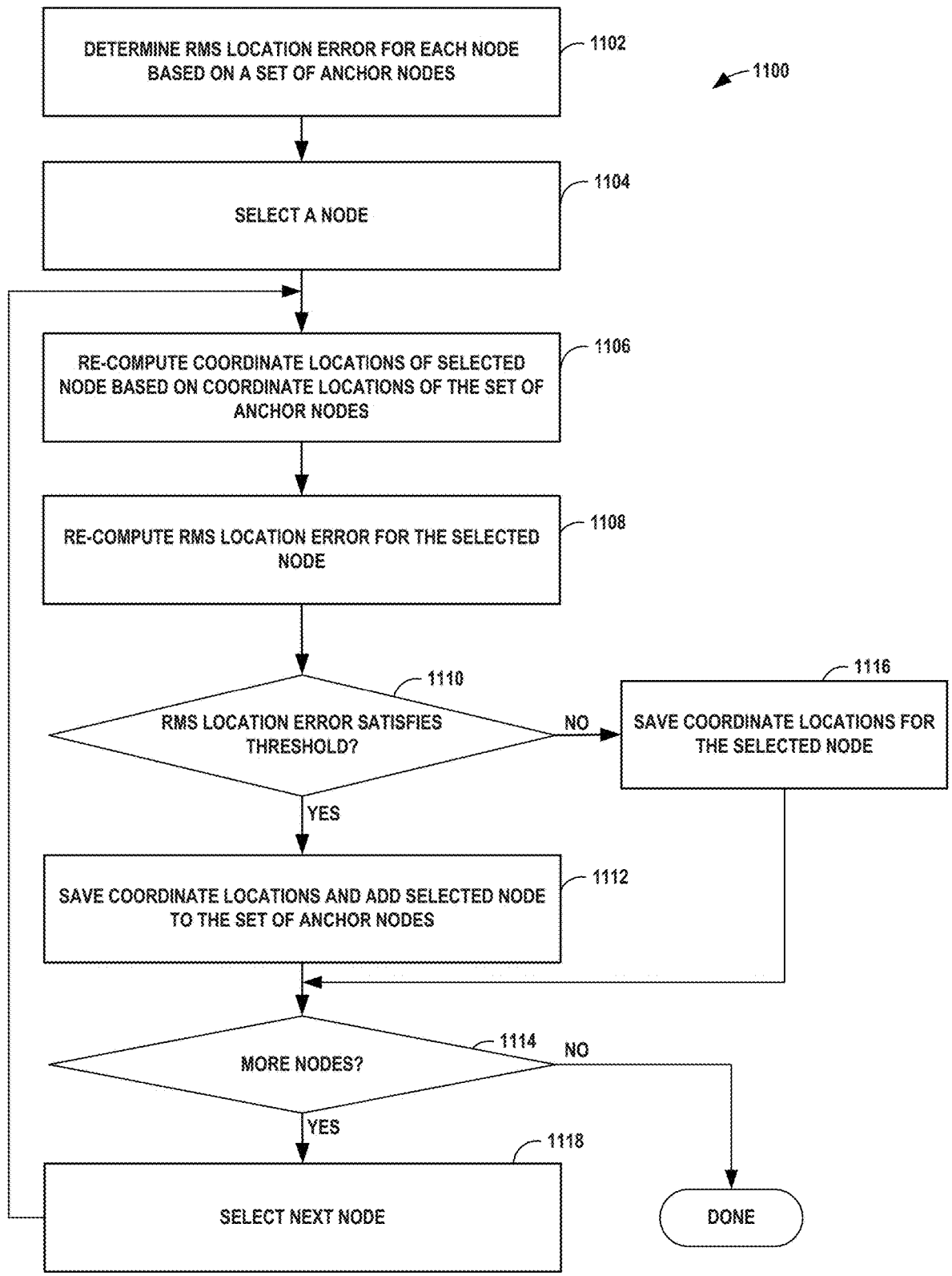
FIG. 11A-11B are flowcharts of example processes by which a computing device performs a second localization phase and a third phase localization phase, respectively, in accordance with one or more techniques of the disclosure.

FIG. 11A is a flowchart of an example process (1100) by which a computing device adjusts the determined coordinate locations of one or more nodes (e.g., APs) in a wireless network during a second localization phase. The computing device determines an RMS location error for each node of the wireless network for which a distance measurement can be obtained based on a set of anchor nodes (1102). The computing device selects a node for which to re-compute the coordinate locations (1104). In some examples, the selected node is the node with the highest RMS location error. The computing device re-computes the coordinate locations of the selected node based on the coordinate locations of the set of anchor nodes (1106). The computing device re-computes the RMS location error for the selected node (1108). If the RMS location error satisfies a threshold (YES branch of 1110), the computing device adds the selected node to the set of anchor nodes (1112). If the RMS location error does not satisfy the threshold (NO branch of 1110), the computing device saves the newly computed coordinate locations for the selected node (1116) but does not add the selected node to the set of anchor nodes. If there are more nodes to be checked (YES branch of 1114), the computing device selects a next node (1118) and repeats steps (1102)-(1118) for all remaining nodes. Once all nodes have been checked (NO branch of 1114), the second localization phase process is complete.

Figure 12:
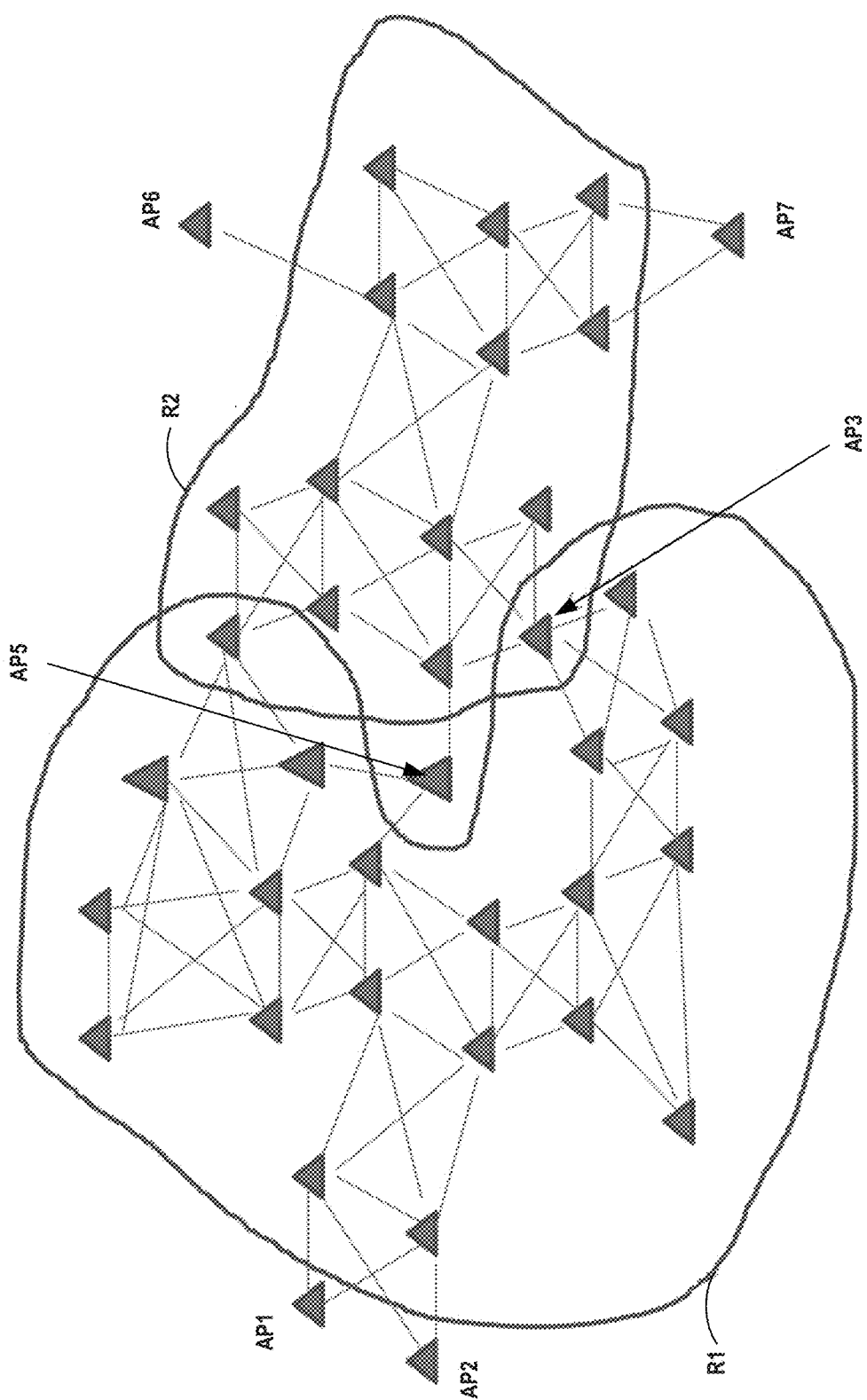
FIG. 12 is an illustration of an example wireless network in accordance with one or more techniques of the disclosure.

FIG. 12 is an illustration of an example wireless network 2000 in accordance with a specific deployment scenario in accordance with one or more techniques of the disclosure. Assume in this example that wireless network 2000 can be divided into two clusters, R1 and R2, wherein all of the APs in R1 are members of robust quads, and similarly all of the APs in R2 are members of robust quads.

AP1 and AP2 are attached to a single cluster R1 but because they are not members of a robust quad, they are not members of R1. Similarly, AP6 and AP7 are attached to a single cluster R2 but because they are not members of a robust quad, they are not members of R2.

AP3 and AP4 are members of both R1 and R2 because they are members of robust quads in both within R1 and within R2. AP5 is attached to both clusters R1 and R2 but is not a member of either one of them.

In accordance with one or more techniques of the disclosure, in a first phase, a computing device determines the location of the APs within each one of the clusters R1 and R2. For sake of simplicity the various APs in these two clusters are not enumerated. Once the relative locations of APs within each one of these two clusters are determined, the system identifies AP3 and AP4 as belonging to the two clusters and uses the locations of these two APs to stitch together the two clusters. Assuming R1 used the global coordinate system and R2 used its own local coordinate system, the locations of the APs in R2 are mapped to the global coordinate system using the equations described above. At the end of this phase, the locations of all APs with the exception of AP1, AP2, AP5, AP6 and AP7 in the global coordinate system (i.e., the coordinate system for R1) are determined.

To determine the location of the APs which have not been determined in the previous phase, the computing device first determines which one of the APs which is not a member of a robust quad has the most wireless connections to an existing robust quad. For example, AP5 has three wireless connections (e.g., is a neighbor of two APs within R1 and a neighbor of one AP within R2). Therefore, in the next phase of the algorithm, the system determines the location of AP5. In a subsequent phase of the algorithm, the system determines the locations of AP1, AP2, and AP7 one of these having two wireless connections to APs which are within clusters R1 and/or cluster R2. As such, in the next phase, the system determines the location of these APs.

The location of APs such as AP6 which has only a single wireless connection to any other AP cannot be determined automatically and as such the system flags this AP and alerts an IT technician to manually measure the precise location of this AP.

Figure 11B:
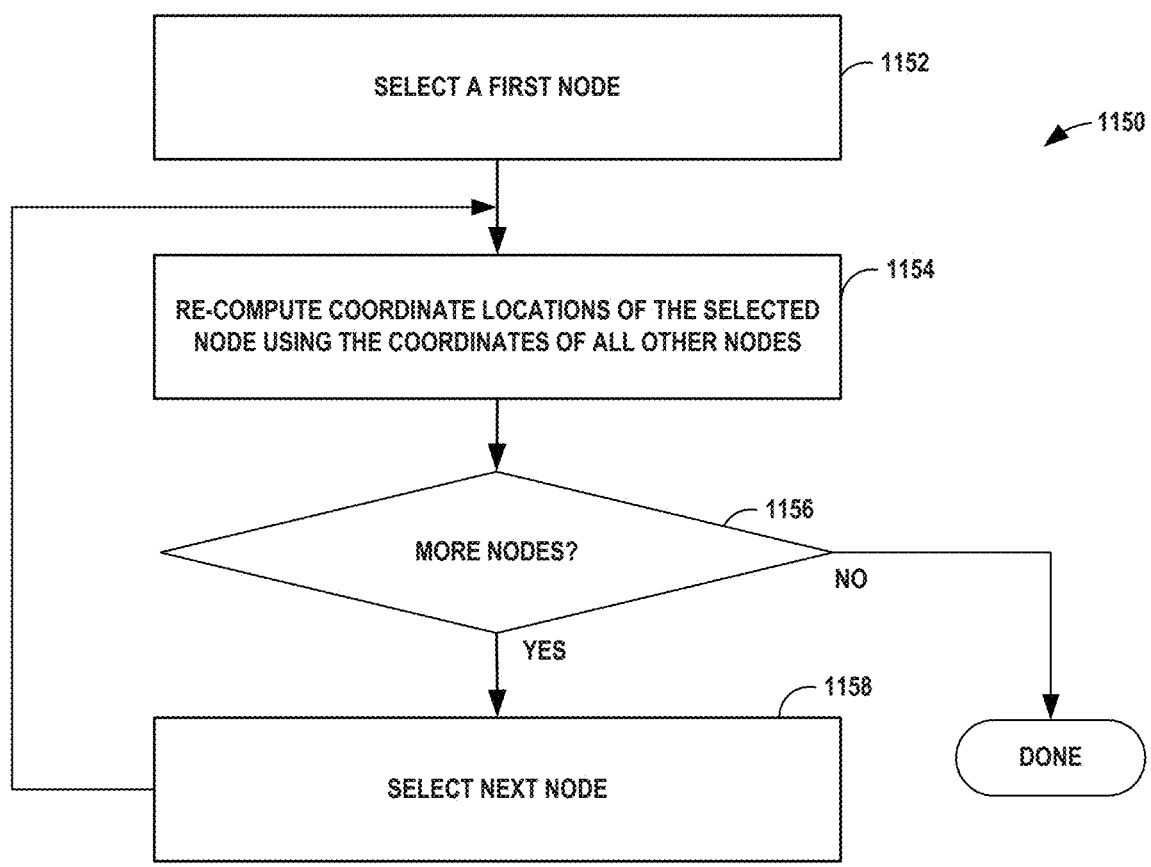

During an example third localization phase, each node is run through a global optimization function that uses all of the other nodes for which a coordinate location has been determined as anchor nodes in a multilateration problem. FIG. 11B is a flowchart of an example process (1150) by which a computing device, such as NMS 130/300 or other computing device executing AP location module 135/372, adjusts determined coordinate locations of one or more nodes (e.g., APs) in a wireless network during a second localization phase. The determined coordinate locations of the nodes input into the third localization phase may include the coordinate locations determined during the second localization phase described above with respect to FIG. 11A. In another example, the determined coordinate locations input into the third localization phase may include the coordinate locations determined using the process described with respect to FIGS. 8A-8E.

The computing device selects a first node (1152). The computing device re-computes the coordinate locations of the selected node based on the coordinate locations of all of the other nodes within communication range (1154). If there are more nodes to run through the third localization phase (YES branch of 1156), the computing device selects the next node (1158) and repeats process (1152)-(1158) for the next node. If all nodes have been checked (NO branch of 1156) the process is complete.

After completion of the first phase (and/or second and third phases) of the AP localization determination process, the coordinate locations of all nodes in the network are determined in a local space with respect to the anchor quad. That is, the coordinate locations of all nodes are determined in a local coordinate system defined with respect to the anchor quad, where the anchor quad is determined based on the one or more criteria or a score for selecting the anchor quad as discussed herein.

In accordance with one or more techniques of the disclosure, the coordinates of the locations of the nodes may be determined with respect to a global coordinate system for the site. In some examples, the coordinates of the anchor nodes are manually measured and known with respect to the global coordinate system for the site. The coordinate locations of each node are transformed and rotated from their coordinate locations in their respective local coordinate system to their corresponding coordinate locations in the global coordinate system with respect to the site based on the known coordinates of the anchor nodes in the global coordinate system.

In other examples, the coordinates of any 3 or 4 nodes may be selected and their coordinate locations measured and known with respect to the site. These nodes may, but do not necessarily, include one or more nodes of the anchor quad. In these examples, the nodes to be measured may be selected based on convenience and/or ease of measurement at the site, or based on any other consideration. The known coordinates of the locations of these selected nodes are used for purposes of the transformation and/or rotation of the coordinate locations of the other nodes into their corresponding coordinate locations in the global coordinate system for the site. In some examples, precise manual measurements of the coordinates of the location of the nodes of the anchor quad may yield better results for all nodes (e.g., computed coordinate locations that are closer to their actual coordinate locations in the global coordinate system) as compared to manual measurement of any selected nodes. However, the error resulting from measurement of any selected nodes is still within acceptable limits (e.g., within 1-2 meters).

In accordance with one or more techniques of the disclosure, in some examples, the computing device utilizes machine learning techniques, such as hyperparameter tuning, to fine-tune the $d_{min}$ value discussed above. For example, when automatically determining AP locations at a site, the value of $d_{min}$ can be set or adjusted in order to optimize localization error. In accordance with one or more techniques of the disclosure, it has been determined that, in some examples, the optimal $d_{min}$ value is dependent on both the standard deviation of RTT/FTM measurement error and the topology of the network. For example, networks that have more uniform node placement may generally benefit from larger $d_{min}$ values, leading to more restrictive robust quad selection (i.e., fewer robust quads satisfying the inequality shown above). As another example, networks with either less uniform or more isolated AP placement may generally benefit from smaller $d_{min}$ values. As another example, smaller networks (e.g., those with fewer APs or where APs form a more linear deployment) may also benefit from lower $d_{min}$ values. Hyperparameter tuning takes advantage of the algorithm's speed to run multiple iterations of the algorithm with different $d_{min}$ values, selecting the most optimum to localize the map.

In these examples, $d_{min}$ is the algorithms hyperparameter. A base $d_{min}$ is selected dependent on the number of nodes on a given map. A $d_{min}$ cutoff threshold and $d_{min}$ step width are given as function arguments. The $d_{min}$ value will then step from $d_{min}$ to the $d_{min}$ cutoff threshold. For each $d_{min}$ value, the algorithm runs the first three passes, selecting different anchors and calculating different robust quads. At the end of the global optimization step, the RMS error for each point is calculated and summed. The resultant total RMS error is inversely proportional to the algorithms ability to place each AP within relation to the distance measurements of all neighbors thus the lowest total RMS error corresponds to the ideal $d_{min}$ value. The algorithm then enters the map translation step with the ideal $d_{min}$ value.

Figure 13:
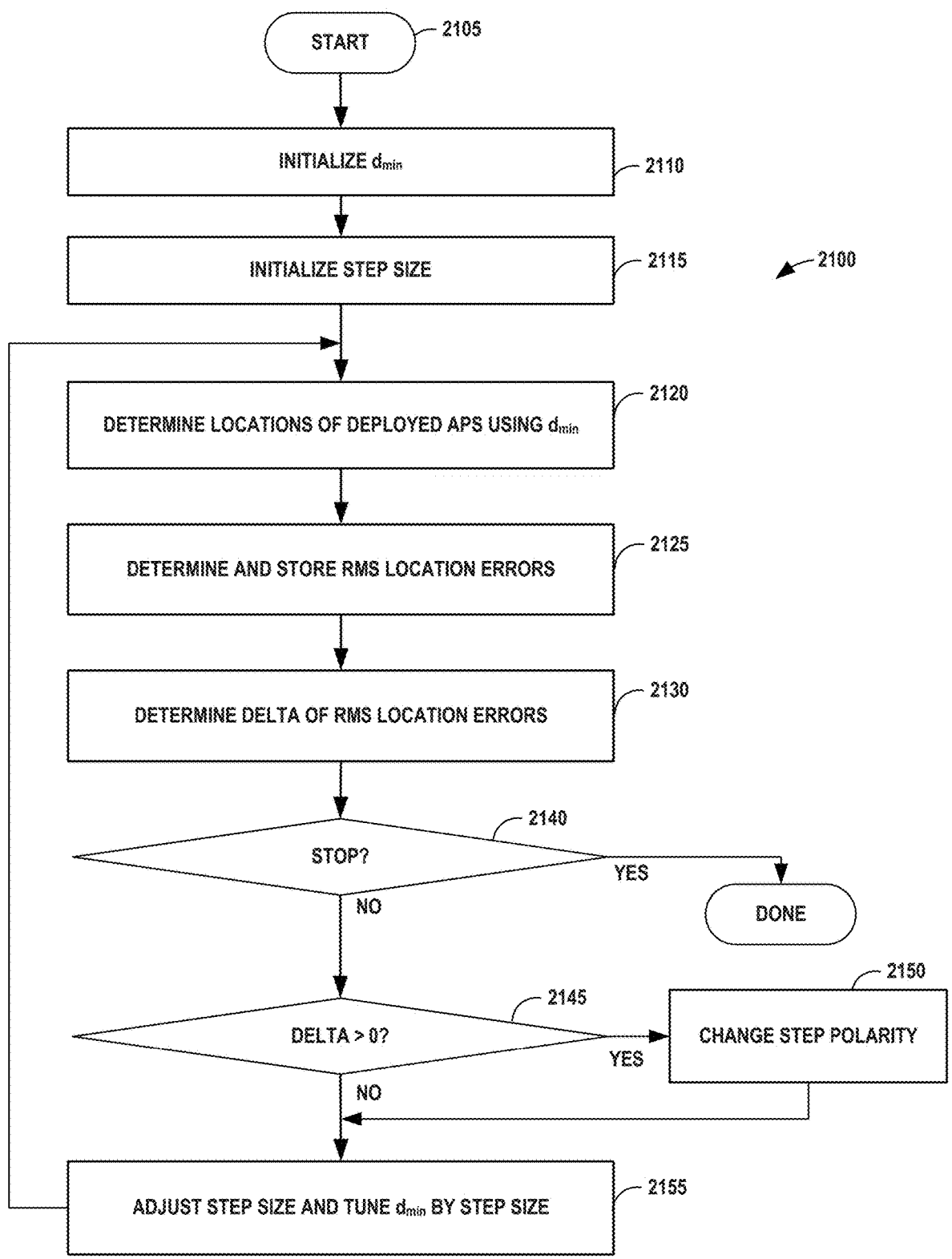
FIG. 13 is a flowchart of an example machine learning (ML) hyperparameter optimization process in accordance with one or more techniques of the disclosure.

FIG. 13 is a flowchart of an example machine learning (ML) hyperparameter optimization process (2100) in accordance with one or more techniques of the disclosure. Upon start of the process (2105), the computing device initializes the $d_{min}$ parameter (2110) and the step size (2110). The computing device utilizes the techniques described above to determine the locations of the deployed APs (2120). One of the parameters used in the process of determining the locations of the deployed APs is the $d_{min}$ parameter. Once the locations are determined, the computing device calculates and stores the RMS of the locations error (2125). The computing device calculates the difference (delta) between the current RMS of the location errors and the stored value (2130). This step (2130) is skipped in the first iteration of the process (since in the first iteration, the stored value does not have any meaningful value).

The computing device evaluates whether the process reached a stopping criteria and should stop (2140). For example, the stopping condition may be triggered when the delta between the current RMS of locations errors and the stored RMS of locations errors is smaller than a predefined threshold. This would be an indicator that the system achieved an optimal (smallest) RMS of locations errors. Alternatively, or in addition, the system may count the number of times it iterates through the loop and trigger the stopping condition if the number exceeds a predefined number. This would indicate that the machine learning process failed to converge. In either case the system may notify the user about the reason that triggered the stopping condition.

If the stopping condition is detected (YES branch of 2140) the process is complete. However, if the stopping condition is not met (NO branch of 2140), the computing device examines the polarity of the delta (2145). If the polarity of the delta is positive (YES branch of 2145) (current RMS location error greater than stored RMS location error) it means that the optimization went the wrong way (i.e., the condition worsened). To point the optimization in the right direction (the direction that would reduce the RMS location error), the polarity (direction) of the optimization step is reversed (2150). If the polarity of the delta is negative (or 0) (NO branch of 2145) the optimization went in the correct direction and the process proceeds with the same step polarity. The process proceeds to step (2155)

either with the reversed step polarity (from 2150) or with the same step polarity (from 2145). The computing device adjusts the size of the step size and the Hyperparameter, e.g., $d_{min}$ (2155). First the size of the step is adjusted based on the delta between the current and stored RMS location errors. As the delta gets smaller, the system reduces accordingly the step size. In other words, the closer the system tunes the Hyperparameter to its optimal value, the smaller is the step size set.

With the new $d_{min}$ parameter (2155), the method loops back to operation and process (2100) continues until a stopping condition is met.

In some examples, other techniques may be employed in addition to or alternatively to one or more of the techniques described above.

For example, as described above, if the APs are erroneously determined to be located in flipped/mirrored locations, the flipped/mirrored locations of these APs may adversely impact the optimization process and as such the localizations determined for some or all of the other APs in a wireless network. Thus, in some examples, a computing device may determine if the result includes any "mirrored APs" which the system misplaced. If so, the computing device may remove these APs from the list of APs and re-run the localization techniques of the disclosure without the removed APs so that their erroneously flipped locations do not adversely impact the end result for the remaining APs. Once the remaining APs have been localized, these removed APs may be localized based on, for example, RTT and/or RSSI measurements between the removed AP and two or more other APs. In such examples, the localization method using robust quads is executed twice, once with all of the nodes, and then a second time without the flipped/mirrored nodes, thus resulting in a more accurate location determination.

As another example, the examples herein describe using robust quads to reduce location error when determining AP locations in a wireless network. However, other geometric shapes in addition or alternatively to robust quads may also be used, and the disclosure is not limited in this respect. For example, the techniques of the disclosure may include using, e.g., robust pentagons or other robust graph with more nodes, which has the potential to reduce the error even further while increasing the computational complexity by a negligible factor. This example is based on the assumption that there may be other robust graphs with a larger number of nodes. Therefore, rather than limiting the optimization to take into account only three or four APs for which the location is known, for a robust geometric shape having n edges, this example would include all n constraints of distances to APs for which locations are known. In some examples, the optimization may minimize a cost function such an LLS cost function as described above with respect to Equation 2.

In addition, in such examples, the algorithm would start by identifying nodes for which more than three nodes could be used to estimate the location of that node, (estimate the location of these "supporting nodes") and then determine the location of the next node based on as many as possible distance supporting nodes.

As another example, as nodes are localized from the anchor robust quad and moving outward, each step of determining a location of a new node ($x_n$, $y_n$) introduces incremental location error. As such reducing the number of "layers" by which the method steps further away from the anchor robust square would reduce the overall error in location determination of the last estimated location. Thus, in some examples, the techniques of the disclosure include selecting an anchor robust quad including nodes that are located substantially in the middle or center of the graph (or subgraph), and then proceeds to build the graph (determine the locations of additional nodes) from the anchor nodes towards the outer boundaries of the graph. This may reduce the number of calculation layers for determining/calculating the location of the last/outer APs thus reduce the overall location error. The anchor quad may be determined by determining the nodes having the short distance (e.g., number of hops) to any other node in the graph. For example, methods like betweenness centrality, weighted betweenness centrality, Percolation centrality, etc. can be used to determine nodes in the center of the network and tag them as potential anchor nodes. In another example, a hybrid of the abovementioned methods can be used wherein a weighted score is calculated based on a collection of methods resulting in the nodes with the highest scores becoming candidates for anchor nodes.

The techniques of the disclosure may provide one or more technical advantages and practical applications. As an example, the techniques described herein enable automated determination of the location of a plurality of deployed APs to provide highly accurate determination of AP locations quickly and efficiently. Determining the locations based on robust square relationships between the nodes ensures the accuracy of the location determinations and reduces the likelihood of flip ambiguities and/or discontinuous flex ambiguities. The ability to automatically determine the location of APs may greatly reduce the cost to deploy a wireless network because it is not necessary to dispatch technicians to conduct an on-site survey. It may also increase the accuracy of the determined AP locations as compared to the error-prone and time consuming process of manually measuring and logging of hundreds or even thousands of AP locations. The techniques therefore support the provision of highly accurate location-based services at a site, which depend upon the locations of each of AP being known to a high degree of accuracy. Yet another benefit is that it facilitates automated and remote verification of AP deployment locations without necessitating dispatching technicians to conduct an on-site survey. In addition, the determined AP locations provided by the techniques described herein may further be used for RF coverage optimization and radio resource management of the APs at the site, such as channel and transmit power level selection.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3 GPP), 3 GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2 G, 2.5 G, 3 G, 3.5 G, 4 G, Fifth Generation (5 G), or Sixth Generation (6 G) mobile networks, 3 GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/ lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4 G, Bluetooth®, WirelessHD, WiGig, WiGi, 3 GPP, Wireless LAN, WiMAX, DensiFi SIG, Unifi SIG, 3 GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4 G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:
    a plurality of access points (APs) configured to provide a wireless network at a site; and
    a network management system comprising:
        one or more processors; and
        a memory comprising instructions that when executed by the one or more processors cause the one or more processors to:
            based on neighbor relationships between the plurality of APs, identify a plurality of clusters of APs, wherein each AP in a cluster is a member of at least one robust quad, and wherein each robust quad in the cluster has three APs in common with another robust quad in the cluster;
            determine coordinates of each AP in a global cluster of the plurality of clusters in a global coordinate system based on measured coordinates of at least three anchor APs in the global cluster;
            for each of the plurality of clusters other than the global cluster, determine coordinates of each AP in the cluster in a local coordinate system associated with the cluster;
            for each of the plurality of clusters other than the global cluster, transform the coordinates of each AP in the cluster from the associated local coordinate system to the global coordinate system; and
            automatically invoke, based on the coordinates of one or more of the plurality of APs in the global coordinate system, one or more actions.

2. The system of claim 1, the memory further comprising instructions that when executed by the one or more processors cause the one or more processors to:
    identify the global cluster as one of the plurality of clusters including a highest number of robust quads;
    identify one of the robust quads in the global cluster as an anchor robust quad; and
    define at least three APs in the anchor robust quad as anchor APs; and
    generate a notification identifying the anchor APs.

3. The system of claim 1, the memory further comprising instructions that when executed by the one or more processors cause the one or more processors to:
    for each of the plurality of clusters other than the global cluster, identify a robust quad in the cluster as an origin robust quad; and
    define the associated local coordinate system for the cluster based on at least three APs in the origin robust quad.

4. The system of claim 1, the memory further comprising instructions that when executed by the one or more processors cause the one or more processors to:
    receive data indicative of distances between two or more of the plurality of APs.

5. The system of claim 4, wherein the data indicative of distances between two or more APs includes round trip time (RTT) data.

6. The system of claim 4, the memory further comprising instructions that when executed by the one or more processors cause the one or more processors to:
    determine the coordinates of each AP in the global cluster in the global coordinate system based on absolute locations of at least three anchor APs in the global cluster and the data indicative of distance measurements between APs in the global cluster.

7. The system of claim 4, the memory further comprising instructions that when executed by the one or more processors cause the one or more processors to:
    for each of the plurality of clusters other than the global cluster, determine the coordinates of each AP in the cluster in the associated local coordinate system based on defined of at least three APs in the cluster and the data indicative of distance measurements between APs in the cluster.

8. The system of claim 1, wherein the actions include generating data representative of a user interface (UI) for display on a display device including user interface elements representing one or more of the plurality of APs at the site and the corresponding locations of one or more of the plurality of APs at the site.

9. The system of claim 1, wherein the actions include one or more of:
   automatically analyzing the coordinates of one or more of the plurality of APs in the global coordinate system and generating a notification indicative of whether a deployment of one or more of the plurality of APs at the site is acceptable;
   automatically adjusting transmit power of one or more of the plurality of APs based on the coordinates of the one or more of the plurality of APs; and
   providing location services to one or more wireless client devices associated with the wireless network.

10. The system of claim 1, the memory further comprising instructions that when executed by the one or more processors cause the one or more processors to:
   (a) for each of a plurality of local clusters, determine a distance between the local cluster and the global cluster;
   (b) identify a nearest local cluster to the global cluster based on the determined distances;
   (c) transform coordinates of APs in the nearest local cluster from an associated local coordinate system to the global coordinate system;
   (d) merge the nearest local cluster with the global cluster; and
   (e) repeat steps (a)-(d) until each of the plurality of local clusters has been merged with the global cluster.

11. A method comprising:
   based on neighbor relationships between a plurality of access points (APs), identifying a plurality of clusters of APs, wherein each AP in a cluster is a member of at least one robust quad, and wherein each robust quad in the cluster has three APs in common with another robust quad in the cluster;
   determining coordinates of each AP in a global cluster of the plurality of clusters in a global coordinate system based on measured coordinates of at least three anchor APs in the global cluster;
   for each of the plurality of clusters other than the global cluster, determining coordinates of each AP in the cluster in a local coordinate system associated with the cluster;
   for each of the plurality of clusters other than the global cluster, transforming the coordinates of each AP in the cluster from the associated local coordinate system to the global coordinate system; and
   automatically invoking, based on the coordinates of one or more of the plurality of APs in the global coordinate system, one or more actions.

12. The method of claim 11, further comprising:
   identifying the global cluster as one of the plurality of clusters including a highest number of robust quads;
   identifying one of the robust quads in the global cluster as an anchor robust quad; and
   defining at least three APs in the anchor robust quad as anchor APs; and
   generating a notification identifying the anchor APs.

13. The method of claim 11, further comprising:
   for each of the plurality of clusters other than the global cluster, identifying a robust quad in the cluster as an origin robust quad; and
   defining the associated local coordinate system for the cluster based on at least three APs in the origin robust quad.

14. The method of claim 11, further comprising:
   receiving data indicative of distances between two or more of the plurality of APs, wherein the data indicative of distances between two or more APs includes round trip time (RTT) data.

15. The method of claim 14, further comprising:
   determining the coordinates of each AP in the global cluster in the global coordinate system based on absolute locations of at least three anchor APs in the global cluster and the data indicative of distance measurements between APs in the global cluster.

16. The method of claim 14, further comprising:
   for each of the plurality of clusters other than the global cluster, determining the coordinates of each AP in the cluster in the associated local coordinate system based on defined coordinates of at least three APs in the cluster and the data indicative of distance measurements between APs in the cluster.

17. The method of claim 11, wherein the actions include generating data representative of a user interface (UI) for display on a display device including user interface elements representing one or more of the plurality of APs at a site and the corresponding locations of one or more of the plurality of APs at the site.

18. The method of claim 11, wherein the actions include one or more of:
   automatically analyzing the coordinates of one or more of the plurality of APs in the global coordinate system and generating a notification indicative of whether a deployment of one or more of the plurality of APs at a site is acceptable;
   automatically adjusting transmit power of one or more of the plurality of APs based on the coordinates of the one or more of the plurality of APs; and
   providing location services to one or more wireless client devices associated with a wireless network.

19. The method of claim 11, further comprising:
   (a) for each of a plurality of local clusters, determining a distance between the local cluster and the global cluster;
   (b) identifying a nearest local cluster to the global cluster based on the determined distances;
   (c) transforming coordinates of APs in the nearest local cluster from an associated local coordinate system to the global coordinate system;
   (d) merging the nearest local cluster with the global cluster; and
   (e) repeating steps (a)-(d) until each of the plurality of local clusters has been merged with the global cluster.

20. A Non-transitory computer-readable media comprising instructions that when executed by one or more processors cause the one or more processors to:
   based on neighbor relationships between a plurality of access points (APs), identify a plurality of clusters of APs, wherein each AP in a cluster is a member of at least one robust quad, and wherein each robust quad in the cluster has three APs in common with another robust quad in the cluster;
   determine coordinates of each AP in a global cluster of the plurality of clusters in a global coordinate system based on measured coordinates of at least three anchor APs in the global cluster;
   for each of the plurality of clusters other than the global cluster, determine coordinates of each AP in the cluster in a local coordinate system associated with the cluster;
   for each of the plurality of clusters other than the global cluster, transform the coordinates of each AP in the cluster from the associated local coordinate system to the global coordinate system; and generating data representative of a user interface (UI) for display on a display device including user interface elements representing one or more of the plurality of APs at the site and the corresponding locations of one or more of the plurality of APs at the site.

* * * * *